(12) United States Patent
Loubriel

(10) Patent No.: US 11,144,870 B2
(45) Date of Patent: Oct. 12, 2021

(54) SYSTEMS AND METHODS FOR RESERVING SPACE IN CARRIER VEHICLES TO PROVIDE ON DEMAND DELIVERY SERVICES

(71) Applicant: UNITED PARCEL SERVICE OF AMERICA, INC., Atlanta, GA (US)

(72) Inventor: Paul Loubriel, Ossining, NY (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 745 days.

(21) Appl. No.: 14/859,766

(22) Filed: Sep. 21, 2015

(65) Prior Publication Data

US 2017/0083862 A1 Mar. 23, 2017

(51) Int. Cl.
G06Q 10/08 (2012.01)

(52) U.S. Cl.
CPC ................ *G06Q 10/0835* (2013.01)

(58) Field of Classification Search
CPC .................................................. G06Q 10/0835
See application file for complete search history.

(56) References Cited

U.S. PATENT DOCUMENTS

| | | |
|---|---|---|
| 4,611,268 A | 9/1986 | Gotz et al. |
| 5,430,831 A | 7/1995 | Snellen |
| 5,699,258 A | 12/1997 | Thiel |
| 6,219,653 B1 | 4/2001 | O'Neill et al. |
| 6,477,503 B1 | 11/2002 | Mankes |
| 6,606,604 B1 | 8/2003 | Dutta |

(Continued)

FOREIGN PATENT DOCUMENTS

| | | |
|---|---|---|
| CN | 1598850 A | 3/2005 |
| GB | 2461722 A | 1/2010 |

(Continued)

OTHER PUBLICATIONS

'eFulfillment service,' "What is Order Fulfillment?", Jan. 15, 2013; efulfillmentservice.com; retrieved from https://www.efulfillmentservice.com/2013/01/what-is-order-fulfillment/) (Year: 2013).*

(Continued)

*Primary Examiner* — John P Go
*Assistant Examiner* — Bryan J Kirk
(74) *Attorney, Agent, or Firm* — Shook, Hardy & Bacon L.L.P.

(57) ABSTRACT

An unallocated item/product inventory is maintained in each of a plurality of delivery vehicles traversing service routes within a delivery service area. Upon receipt of an order for delivery of an item/product that may be selected from the item/product inventory maintained within a delivery vehicle and that is to be delivered to a destination location within the delivery service area, a delivery vehicle driver is instructed to deliver an item/product selected from the item/product inventory located on the delivery vehicle during the corresponding service route on the same day that the order was placed. A delivery label for the item/product is printed, and the delivery vehicle driver secures the printed delivery label to an item/product selected from the unallocated item/product inventory, and delivers the item/product to the destination location on the same day the order was placed.

11 Claims, 8 Drawing Sheets

(56) References Cited

U.S. PATENT DOCUMENTS

| | | |
|---|---|---|
| 6,622,127 B1 | 9/2003 | Klots et al. |
| 6,701,299 B2 | 3/2004 | Kraisser et al. |
| 6,952,628 B2 | 10/2005 | Prutu |
| 7,015,824 B2 | 3/2006 | Cleveland et al. |
| 7,137,556 B1 | 11/2006 | Bonner et al. |
| 7,139,721 B2 | 11/2006 | Borders et al. |
| 7,158,948 B1 | 1/2007 | Rodriguez et al. |
| 7,177,825 B1 | 2/2007 | Borders et al. |
| 7,181,426 B2 | 2/2007 | Dutta |
| 7,233,907 B2 | 6/2007 | Young |
| 7,252,227 B2 | 8/2007 | Chase |
| 7,295,990 B1 | 11/2007 | Braumoeller et al. |
| 7,313,460 B1 | 12/2007 | Prater et al. |
| 7,363,126 B1 | 4/2008 | Zhong et al. |
| 7,509,228 B2 | 3/2009 | Bielefeld et al. |
| 7,624,024 B2 | 11/2009 | Levis et al. |
| 7,647,233 B2 | 1/2010 | Kadaba et al. |
| 7,831,439 B1 | 11/2010 | Bryar et al. |
| 7,925,524 B2 | 4/2011 | Florence |
| 7,962,422 B1 | 6/2011 | Melechko et al. |
| 8,068,930 B2 | 11/2011 | Perez et al. |
| 8,073,723 B1 | 12/2011 | Bilibin et al. |
| 8,108,321 B2 | 1/2012 | Neal et al. |
| 8,306,875 B2 | 11/2012 | Schneur |
| 8,311,850 B2 | 11/2012 | Johnson et al. |
| 8,386,397 B1 | 2/2013 | Agarwal et al. |
| 8,407,151 B1 | 3/2013 | Agarwal et al. |
| 8,407,154 B1 | 3/2013 | Fallows |
| 8,429,019 B1 | 4/2013 | Yeatts et al. |
| 8,433,659 B2 | 4/2013 | Johnston et al. |
| 8,473,425 B1 | 6/2013 | Maurer et al. |
| 8,554,694 B1 | 10/2013 | Ward et al. |
| 8,572,002 B2 | 10/2013 | Kadaba |
| 8,615,473 B2 | 12/2013 | Spiegel et al. |
| RE45,160 E | 9/2014 | Ferlauto et al. |
| 8,924,312 B2 | 12/2014 | Kadaba |
| 9,020,846 B2 | 4/2015 | Siris |
| 9,047,607 B1 | 6/2015 | Curial et al. |
| 9,269,103 B1 | 2/2016 | Kumar et al. |
| 9,466,043 B1 | 10/2016 | Agarwal et al. |
| 9,552,564 B1 * | 1/2017 | Martenis ............... G07C 5/008 |
| 9,990,602 B2 | 6/2018 | Arunapuram |
| 10,127,517 B2 | 11/2018 | Carr et al. |
| 10,163,119 B1 | 12/2018 | Bolton et al. |
| 10,198,707 B1 | 2/2019 | Bolton et al. |
| 10,332,064 B1 | 6/2019 | Davidson et al. |
| 10,387,822 B1 | 8/2019 | Bolton et al. |
| 10,453,004 B2 | 10/2019 | Davidson et al. |
| 10,467,580 B1 | 11/2019 | Davidson |
| 2001/0029473 A1 | 10/2001 | Yamaoka et al. |
| 2001/0042024 A1 | 11/2001 | Rogers |
| 2001/0051885 A1 | 12/2001 | Nardulli et al. |
| 2002/0007299 A1 | 1/2002 | Florence |
| 2002/0007353 A1 | 1/2002 | Kornacki |
| 2002/0016726 A1 | 2/2002 | Ross |
| 2002/0103724 A1 | 8/2002 | Huxter |
| 2002/0107820 A1 | 8/2002 | Huxter |
| 2002/0111914 A1 | 8/2002 | Terada et al. |
| 2002/0147654 A1* | 10/2002 | Kraisser ............ G06Q 10/0631 705/330 |
| 2002/0178023 A1 | 11/2002 | Bjerre et al. |
| 2003/0009361 A1 | 1/2003 | Hancock et al. |
| 2003/0036935 A1* | 2/2003 | Nel ................ G06Q 10/06312 705/7.22 |
| 2003/0046133 A1 | 3/2003 | Morley et al. |
| 2003/0130753 A1 | 7/2003 | Grant et al. |
| 2003/0200111 A1 | 10/2003 | Damji |
| 2004/0030572 A1 | 2/2004 | Campbell et al. |
| 2004/0151068 A1 | 8/2004 | Carlsruh et al. |
| 2004/0215480 A1* | 10/2004 | Kadaba ................... B07C 3/00 705/338 |
| 2004/0249699 A1 | 12/2004 | Laurent et al. |
| 2005/0080638 A1 | 4/2005 | Maseruka |
| 2005/0165629 A1 | 7/2005 | Bruns |
| 2005/0171738 A1 | 8/2005 | Kadaba |
| 2005/0197876 A1* | 9/2005 | Benda ............. G06Q 10/08355 705/333 |
| 2005/0216319 A1 | 9/2005 | Reblin |
| 2005/0267791 A1 | 12/2005 | LaVoie et al. |
| 2005/0278063 A1* | 12/2005 | Hersh ............. G06Q 10/06311 700/216 |
| 2006/0041481 A1 | 2/2006 | Stowe |
| 2006/0261164 A1 | 11/2006 | Bochicchio |
| 2007/0083410 A1 | 4/2007 | Hanna |
| 2008/0091342 A1 | 4/2008 | Assael |
| 2008/0235147 A1 | 9/2008 | Jensen |
| 2008/0245873 A1 | 10/2008 | Dwinell et al. |
| 2008/0275643 A1 | 11/2008 | Yaqub et al. |
| 2008/0294536 A1* | 11/2008 | Taylor ................... G06Q 10/08 705/28 |
| 2008/0301009 A1 | 12/2008 | Plaster et al. |
| 2008/0306795 A1 | 12/2008 | Ho |
| 2009/0106124 A1 | 4/2009 | Yang |
| 2009/0164295 A1 | 6/2009 | Sion |
| 2009/0187489 A1 | 7/2009 | Mallick et al. |
| 2010/0004960 A1 | 1/2010 | Frankenberg et al. |
| 2010/0094769 A1 | 4/2010 | Davidson et al. |
| 2010/0100507 A1 | 4/2010 | Davidson et al. |
| 2010/0121689 A1 | 5/2010 | Wallace et al. |
| 2010/0161170 A1 | 6/2010 | Siris |
| 2010/0169000 A1 | 7/2010 | Overgoor et al. |
| 2010/0211426 A1* | 8/2010 | McClurg ................ G06Q 10/06 705/336 |
| 2010/0312715 A1 | 12/2010 | Esque et al. |
| 2011/0047000 A1 | 2/2011 | Perry |
| 2011/0065458 A1 | 3/2011 | Staton et al. |
| 2011/0231334 A1 | 9/2011 | Jindel |
| 2011/0258014 A1 | 10/2011 | Evangelist et al. |
| 2011/0288958 A1 | 11/2011 | Obasanjo et al. |
| 2012/0030133 A1 | 2/2012 | Rademaker |
| 2012/0059729 A1 | 3/2012 | Roa et al. |
| 2012/0072363 A1 | 3/2012 | Spiegel et al. |
| 2012/0143882 A1 | 6/2012 | Zheng et al. |
| 2012/0150433 A1 | 6/2012 | Hulubei |
| 2012/0246090 A1 | 9/2012 | Griffith et al. |
| 2012/0284083 A1 | 11/2012 | Wu et al. |
| 2012/0303540 A1 | 11/2012 | Marcus et al. |
| 2012/0323645 A1* | 12/2012 | Spiegel ................ G06Q 10/083 705/14.1 |
| 2013/0006739 A1 | 1/2013 | Horvitz et al. |
| 2013/0013350 A1 | 1/2013 | McCullough et al. |
| 2013/0066844 A1 | 3/2013 | Bowers et al. |
| 2013/0144428 A1 | 6/2013 | Irwin et al. |
| 2013/0151435 A1 | 6/2013 | Hocquette et al. |
| 2013/0166359 A1 | 6/2013 | Kadaba |
| 2013/0262336 A1 | 10/2013 | Wan et al. |
| 2013/0325737 A1 | 12/2013 | Smalling et al. |
| 2013/0325741 A1 | 12/2013 | Smalling et al. |
| 2014/0025464 A1 | 1/2014 | Kadaba |
| 2014/0052661 A1 | 2/2014 | Shakes et al. |
| 2014/0082505 A1 | 3/2014 | Watson et al. |
| 2014/0095350 A1 | 4/2014 | Carr et al. |
| 2014/0148944 A1 | 5/2014 | Bailey et al. |
| 2014/0149244 A1 | 5/2014 | Abhyanker |
| 2014/0188748 A1 | 7/2014 | Cavoue et al. |
| 2014/0229338 A1 | 8/2014 | Borders et al. |
| 2014/0279667 A1 | 9/2014 | Gillen |
| 2014/0297554 A1 | 10/2014 | Armato |
| 2014/0330741 A1 | 11/2014 | Bialynicka-Birula et al. |
| 2015/0081587 A1 | 3/2015 | Gillen |
| 2015/0120364 A1* | 4/2015 | Deshpande ....... G06Q 10/06312 705/7.22 |
| 2015/0161667 A1 | 6/2015 | Stevens et al. |
| 2015/0178678 A1 | 6/2015 | Carr et al. |
| 2015/0199644 A1 | 7/2015 | Siris |
| 2015/0227890 A1 | 8/2015 | Bednarek et al. |
| 2015/0228004 A1 | 8/2015 | Bednarek et al. |
| 2015/0248795 A1 | 9/2015 | Davidson |
| 2015/0262433 A1 | 9/2015 | Davidson |
| 2015/0269520 A1 | 9/2015 | Knapp et al. |
| 2015/0294262 A1 | 10/2015 | Nelson et al. |
| 2015/0302347 A1 | 10/2015 | Fredette |
| 2015/0356503 A1 | 12/2015 | LaVoie et al. |
| 2015/0363843 A1 | 12/2015 | Loppatto et al. |

(56) References Cited

U.S. PATENT DOCUMENTS

| | | | |
|---|---|---|---|
| 2016/0071056 A1 | 3/2016 | Ellison et al. | |
| 2016/0078510 A1* | 3/2016 | Gadre | G06Q 10/087 |
| | | | 705/26.4 |
| 2016/0232477 A1* | 8/2016 | Cortes | G06Q 10/087 |
| 2020/0229137 A1 | 7/2020 | Rubin et al. | |

FOREIGN PATENT DOCUMENTS

| | | |
|---|---|---|
| WO | WO 2000/068856 A2 | 11/2000 |
| WO | WO 2001/071534 A2 | 9/2001 |
| WO | WO 2013/134417 A1 | 9/2013 |
| WO | WO-2014032443 A1 * 3/2014 | G06Q 10/087 |

OTHER PUBLICATIONS

Non-Final Office Action received for U.S. Appl. No. 14/988,552, dated Oct. 4, 2018, 17 pages.
Final Office Action received for U.S. Appl. No. 14/664,202, dated Apr. 20, 2018, 18 pages.
Final Office Action received for U.S. Appl. No. 14/664,223, dated Apr. 20, 2018, 18 pages.
Final Office Action received for U.S. Appl. No. 14/988,527, dated Feb. 26, 2018, 13 pages.
Non-Final Office Action received for U.S. Appl. No. 14/694,313, dated Apr. 3, 2018, 15 pages.
"How it Works—Cargo Sensors," General Electric Company, http://web.archive.org/web/20070307032108/http://www.trailerservices.com/veriwise/cargo.html, Mar. 7, 2007.
"Tap Your Phone, Get Stuff (Including Funding)" [online] [retrieved May 27, 2015]. Retrieved from the Internet: <URL: http://techcrunch.com/2014/04/06/tap-your-phone-get-stuff-including-funding/> (dated Apr. 6, 2014) 8 pages.
American Airlines, "American Airlines Cargo—Reservations", Aug. 5, 2013 to Sep. 19, 2015, Internet Archive <http://web.archive.org/web/20130805094248/https://www.aacargo.com/learn/reservations.html>, 4 pages.
Browning-Blas, Kristen, "Schwan's frozen-food truckers are driven to make customers' day", *The Denver Post*, Sep. 17, 2008, retrieved from <http://www.denverpost.com/browning/ci_10472479>, on Mar. 20, 2016, 9 pages, U.S.A.
Evans, Kenneth R., et al., "Purchasing Motor Carrier Service: An Investigation of the Criteria Used by Small Manufacturing Firms", *Journal of Small Business Management*, vol. 28.1, p. 39, 1990; retrieved from Google Scholar at <https://www.questia.com/library/journal/1G1-8854587/purchasing-motor-carrier-service-an-investigation>, on Mar. 20, 2016.
U.S. Appl. No. 13/828,652, "Systems and Methods for Synchronized Delivery", Unpublished (filed Mar. 14, 2013), (Chris Bolton, Inventor) (United Parcel Service of America, Inc., assignee).
U.S. Appl. No. 13/964,766, "Methods, Apparatuses and Computer Program Products for Generating Logistics Zones", Unpublished (filed Aug. 12, 2013), (Mark J. Davidson, Inventor) (United Parcel Service of America, Inc., assignee).
U.S. Appl. No. 14/046,172, "Methods, Apparatuses and Computer Program Products for Identifying Duplicate Travel", Unpublished (filed Oct. 4, 2013), (Mark J. Davidson, inventor) (United Parcel Service of America, Inc., assignee).
U.S. Appl. No. 14/988,136, "Systems and Methods for Synchronized Delivery", Unpublished (filed Jan. 5, 2016), (Chris Bolton, Inventor) (United Parcel Service of America, Inc., assignee).
U.S. Appl. No. 14/988,527, "Systems and Methods for Synchronized Delivery", Unpublished (filed Jan. 5, 2016), (Chris Bolton, Inventor) (United Parcel Service of America, Inc., assignee).
U.S. Appl. No. 14/988,536, "Systems and Methods for Synchronized Delivery", Unpublished (filed Jan. 5, 2016), (Chris Bolton, Inventor) (United Parcel Service of America, Inc., assignee).
U.S. Appl. No. 14/988,545, "Systems and Methods for Synchronized Delivery", Unpublished (filed Jan. 5, 2016), (Chris Bolton, Inventor) (United Parcel Service of America, Inc., assignee).
U.S. Appl. No. 14/988,552, "Systems and Methods for Synchronized Delivery", Unpublished (filed Jan. 5, 2016), (Chris Bolton, Inventor) (United Parcel Service of America, Inc., assignee).
U.S. Appl. No. 14/988,561, "Systems and Methods for Synchronized Delivery", Unpublished (filed Jan. 5, 2016), (Chris Bolton, Inventor) (United Parcel Service of America, Inc., assignee).
Wohlsen, Marcus, "How Robots and Military-Grade Algorithms Make Same-Day Delivery Possible", Wired.com, Mar. 19, 2013, 8 pages, retrieved from <http://www.wired.com/category/business/?p=76398>, on Mar. 20, 2016.
Non-Final Office Action received for U.S. Appl. No. 14/988,136, dated Aug. 28, 2018, 19 pages.
Non-Final Rejection dated Nov. 30, 2017 for U.S. Appl. No. 13/828,652.
Final Rejection dated Dec. 19, 2017 for U.S. Appl. No. 14/988,561.
Applicant Initiated Interview Summary (PTOL-413) dated Jan. 24, 2018 for U.S. Appl. No. 14/988,561.
Applicant Initiated Interview Summary (PTOL-413) dated Jan. 24, 2018 for U.S. Appl. No. 13/828,652.
Final Office Action received for U.S. Appl. No. 14/988,552, dated Feb. 5, 2019, 26 pages.
Non-Final Office Action received for U.S. Appl. No. 14/664,202, dated Jan. 24, 2019, 21 pages.
Non-Final Office Action received for U.S. Appl. No. 14/664,223, dated Feb. 7, 2019, 23 pages.
Notice of Allowance received for U.S. Appl. No. 14/988,527, dated Apr. 3, 2019, 16 pages.
Final Office Action received for U.S. Appl. No. 14/664,223, dated Sep. 11, 2019, 27 pages.
Non-Final Office Action received for U.S. Appl. No. 14/694,313, dated Aug. 30, 2019, 27 pages.
Non-Final Office Action received for U.S. Appl. No. 14/988,552, dated Sep. 30, 2019, 30 pages.
Final Office Action received for U.S. Appl. No. 14/988,545, dated Feb. 12, 2020, 22 pages.
Non-Final Office Action received for U.S. Appl. No. 14/988,536, dated Dec. 10, 2019, 21 pages.
Non-Final Office Action received for U.S. Appl. No. 14/664,223, dated Jun. 25, 2020, 12 pages.
Non-Final Office Action received for U.S. Appl. No. 14/694,313, dated Oct. 5, 2020, 42 pages.
Final Office Action received for U.S. Appl. No. 14/988,552, dated Apr. 30, 2020, 30 pages.
Non-Final Office Action received for U.S. Appl. No. 14/988,552, dated Mar. 19, 2021, 34 pages.
Notice of Allowance received for U.S. Appl. No. 14/988,545, dated Jul. 1, 2021, 10 pages.
Hokey et al., "An Integrated Decision Support System for Global Logistics", International Journal of Physical Distribution & Logistics Management, vol. 24, No. 1, 1994, 17 pages.

* cited by examiner

SYSTEMS AND METHODS FOR RESERVING SPACE IN CARRIER VEHICLES TO PROVIDE ON DEMAND DELIVERY SERVICES

BACKGROUND

E-Commerce and other commercial mechanisms for allowing customers to order items/products from a vendor to be delivered to a selected destination location generally require completion of a plurality of logistics processes in order to transport an item/product from the vendor to the destination location. For example, a carrier charged with transporting the item/product from an item/product origin to an item/product destination must receive the item/product from the item/product origin, often by visiting the item/product origin to pick-up the item. The carrier then may deliver the item/product to a first sort location, where the item/product is sorted based on its intended destination. The carrier may transport the item/product to one or more additional sort locations, where the item/product is again sorted according to its intended destination, before it is loaded onto a delivery vehicle for delivery to the intended destination. These logistics processes often delay delivery of the item/product for one or more days after the customer has ordered the item.

Various processes for providing same-day delivery of ordered items/products thus expedite the required logistics processes in order to move the item/product from a vendor to a destination location within a single day. However, expediting the logistics processes may not always be possible, particularly in circumstances in which transportation between the vendor and the destination location requires a carrier to traverse great distances. Thus, many existing same-day delivery systems are limited to a particular geographical area located around one or more vendor locations such that a carrier (e.g., a local courier) may transport items/products from the vendor to the destination location prior to the end of the order date.

Accordingly, various concepts are needed to provide on-demand, same-day, and other delivery services to any of a variety of geographical areas.

BRIEF SUMMARY

Various embodiments are directed to methods, systems, and computer program products for requesting and reserving space on a carrier vehicle. In various embodiments, the methods, systems, and computer program products are configured for receiving, via the one or more processors, a request for available space on a vehicle for delivery services, the request for available space comprising vendor data identifying (a) a geographic area and (b) a time period for which the available space is requested; identifying a plurality of vehicles associated with the geographic area in which the space is requested; responsive to identifying the plurality of vehicles associated with the geographic area in which the space is requested, requesting utilization data for each of the plurality of vehicles; receiving utilization data for each of the plurality of vehicles; responsive to receiving the utilization data for each of the plurality of vehicles, determining the available space within each of the plurality of vehicles during the time period for which the available space is requested; and providing, via the one or more processors for display via an interface, at least a portion of the determined available space for at least one of the plurality of vehicles. Various embodiments are additionally configured for: receiving a request to reserve at least a portion of the determined available space for at least one of the plurality of vehicles; and updating the utilization data for each of the plurality of vehicles to reflect the reserved portion of the available space. Moreover, in various embodiments the reserved portion of the available space is used to store an item inventory to provide one or more delivery services of items in the item inventory. In various embodiments, the methods, systems, and computer program products are additionally configured for: receiving the item inventory to be stored in the at least one vehicle; receiving order data for an item to be delivered according to at least one of the one or more delivery services, wherein the order data comprises delivery data indicating a destination location; determining, based at least in part on the destination location, an appropriate vehicle to deliver the item from the at least one vehicle, wherein the at least one vehicle is transporting at least a portion of the item inventory; and transmitting instructions to the appropriate vehicle indicating that an item selected from the item inventory is to be delivered to the destination location on the same day that the order is placed. In various embodiments, the order day is received from a vendor computing entity, and in various embodiments, the methods, systems, and computer program products are additionally configured for receiving delivery data indicating that the item has been delivered to the destination location; updating item inventory data for the vehicle indicative of the items remaining in the physical item inventory; and transmitting at least a portion of one of the delivery data or the item inventory data to the vendor computing entity.

Moreover, in various embodiments the unused vehicle capacity is an anticipated unused vehicle capacity determined based at least in part on historical data or dynamic delivery data. Moreover, in various embodiments the one or more vehicles are each scheduled to traverse service routes to deliver and/or pick-up items at one or more locations along the service routes.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
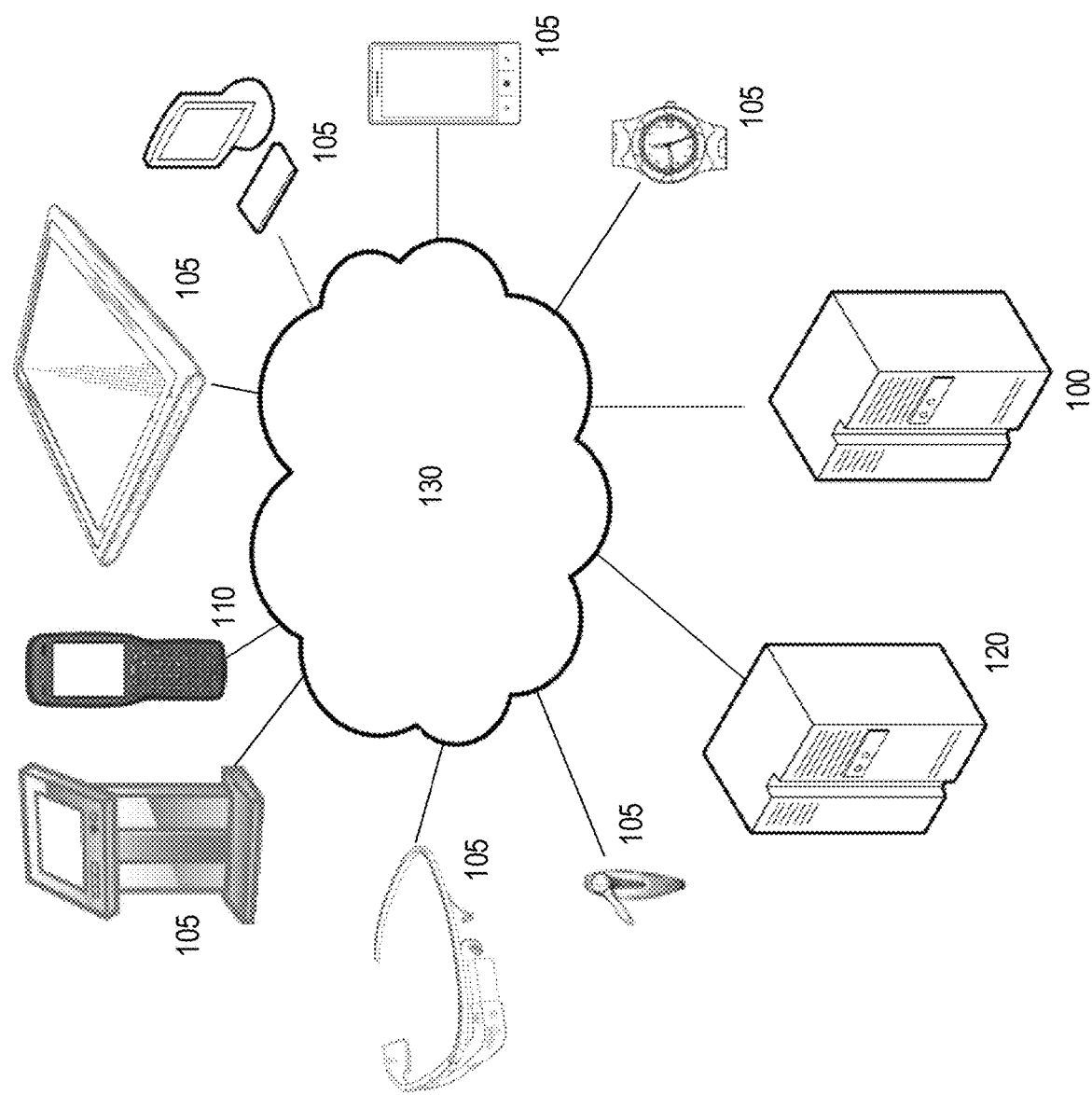
FIG. 1 shows an example system for use in providing one or more delivery services according to various embodiments of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Various embodiments are directed to systems, methods, and computer program products for providing one or more delivery services in one or more regions serviced by a carrier. For example, items may be delivered according to same-day, on demand, 1 hour, 2 hour, next day, two-day, three-day, and/or other delivery services. In various embodiments, the carrier may provide one or more of these delivery services on behalf of a vendor. In various embodiments, the vendor may provide instructions to the carrier regarding which of the one or more delivery services are to be provided. The delivery services may be provided for one or more items/products available from the vendor within a vendor-specified delivery service region. The delivery service region may be independent of the location of the vendor, and may be serviced by one or more delivery vehicles operated by a carrier. An inventory of the items/products for which the one or more delivery services may be provided is stored within each of the delivery vehicles servicing the vendor-specified delivery service region. Thus, upon receiving an order for one of the specified items/products by a customer for delivery within the vendor-specified delivery service region, the vendor may transmit the order to the carrier, which may identify a particular delivery vehicle to deliver the item/product to the customer-specified delivery address. The carrier may then transmit instructions to the delivery vehicle driver to deliver the item, and in response the delivery vehicle driver may print a delivery label, attach the delivery label to one of the items/products selected from the on-board inventory of unallocated items, and may deliver the item/product to the destination location. The carrier may provide these one or more delivery services for a plurality of vendors simultaneously or at separate times. For example, each of a plurality of vendors may store separate item inventories in one or more common carrier delivery vehicles, and the carrier may thus provide the one or more delivery services utilizing the item inventories of the plurality of vendors.

As described in greater detail herein, the carrier may offer logical space to one or more vendors that may desire to store item inventories in one or more of the carrier delivery vehicles and provide one or more delivery services (e.g., on demand or same day delivery services) to their customers. As used herein, logical space can be defined according to various parameters of a space available for rent within a delivery vehicle. The logical space may define a physical amount of space to be reserved within each vehicle (e.g., area of a shelf, cubby, floor space, box, cargo area, and/or total volume), the selected delivery area (e.g., one or more zip codes, neighborhoods, delivery routes, and/or the like), the time period to be reserved (e.g., number of days to be reserved, timing for when the space is reserved, and/or the like), and one or more agreed-upon limitations regarding a service provided by the carrier (e.g., maximum number of deliveries according to the one or more delivery services per day, per vehicle). The logical space may be offered through a publicly available marketplace (e.g., through an Internet-based web portal), may be offered to various entities on an individual basis, and/or the like. Thus, a vendor may reserve logical space defining a configurable amount of space within each of the delivery vehicles in which the unallocated vendor inventory may be stored, a delivery area, an amount of time for which the space is reserved, one or more limitations, and/or the like. The items/products stored within the reserved space in each of the delivery vehicles may be owned by the vendor, and accordingly the carrier may act as a bailee or otherwise maintain possession of the unallocated items/products for the vendor.

Moreover, the carrier may remain in communication with the vendor during the period of time for which delivery services are offered (e.g., the carrier system may remain in communication with a vendor computing entity), such that updated information regarding the availability of delivery services may be provided to the vendor. For example, the carrier may track the inventory levels of each of the items/products in each of the delivery vehicles. Upon a determination that a particular item/product is out of stock in one or more of the delivery vehicles, the carrier may inform the vendor, who may then update the delivery service region in which the one or more delivery services is offered. Such communication may ensure that a customer does not order an item/product that is out of stock on a particular delivery vehicle and therefore unavailable for delivery to a customer specified destination location.

Accordingly, various embodiments include features and/or processes for reserving logical space in one or more delivery vehicles, for receiving items/products and maintaining an inventory of the items/products within the delivery vehicles, for tracking inventory levels of each of the items, and for fulfilling orders for delivery and delivering the items/products to a customer-selected delivery destination.

I. COMPUTER PROGRAM PRODUCTS, METHODS, AND COMPUTING ENTITIES

Embodiments of the present invention may be implemented in various ways, including as computer program items/products that comprise articles of manufacture. A computer program item/product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program item/product embodiment, and/or an embodiment that comprises combination of computer program items/products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of an exemplary embodiment of the present invention. As shown in FIG. 1, this particular embodiment may include one or more carrier systems 100, one or more networks 130, one or more user computing entities 105, one or more mobile devices 110, one or more vendor computing entities 120. Each of these components, entities, devices, systems, and similar words used herein interchangeably may be in direct or indirect communication with, for example, one another over the same or different wired or wireless networks 130. Additionally, while FIG. 1 illustrates the various system entities as separate, standalone entities, the various embodiments are not limited to this particular architecture.

1. Exemplary Carrier System

Figure 2:
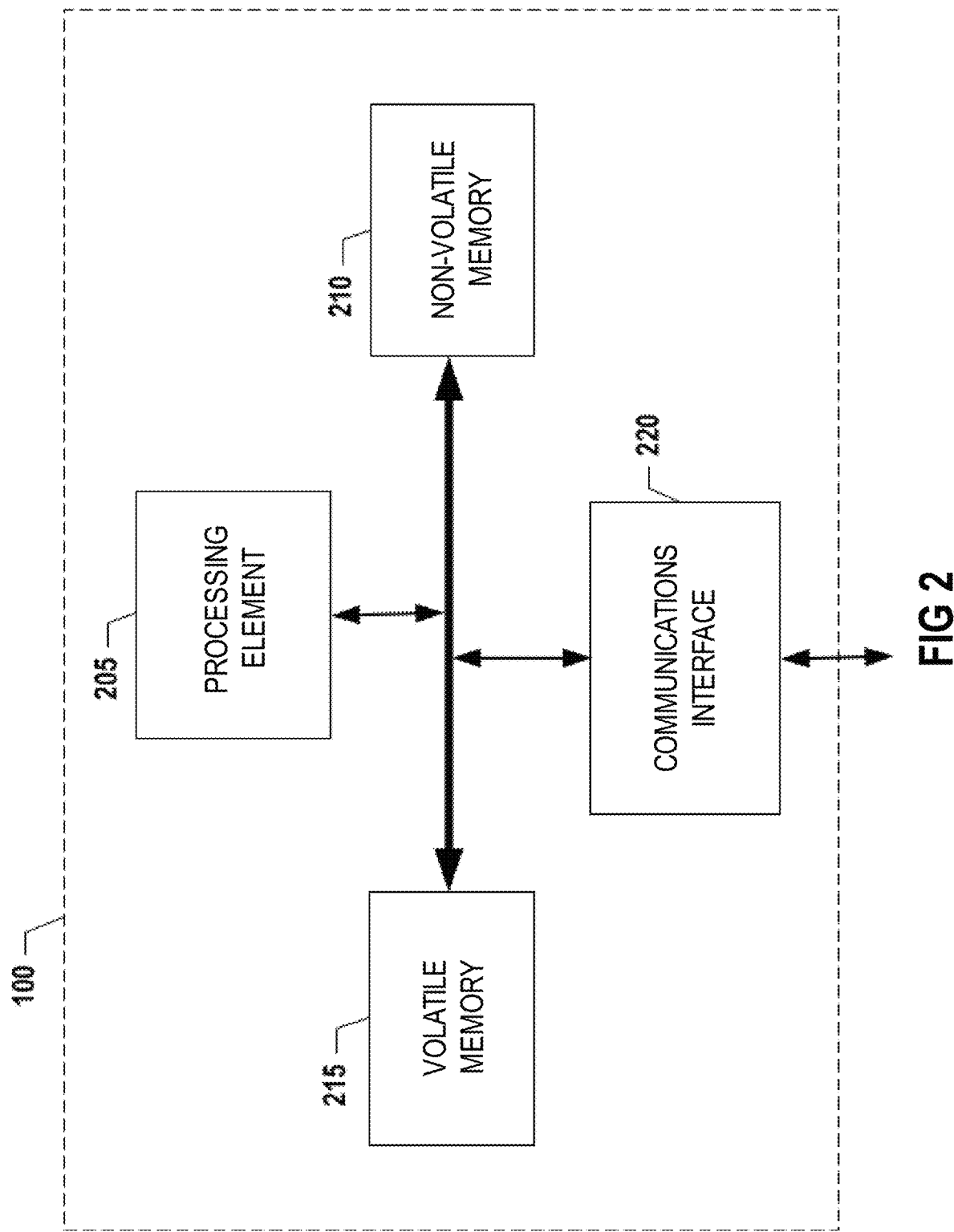
FIG. 2 is a schematic diagram of a carrier system according to various embodiments of the present invention.

FIG. 2 provides a schematic of a carrier system 100 according to one embodiment of the present invention. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, packages, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on information/data, content, information/data, and/or similar terms used herein interchangeably.

The carrier system 100 may also comprise various other systems, such as an Address Matching System (AMS), an Internet Membership System (IMS), a Customer Profile System (CPS), a Package Center information/data System (PCIS), a Customized Pick-up and Delivery System (CPAD), a Web Content Management System (WCMS), a Notification Email System (NES), a Fraud Prevention System (FPS), and a variety of other systems and their corresponding components. The carrier system 100 may also be in communication with various payment networks/systems for carrying out or facilitating the payment of fees. As will be recognized, the payment of such fees may be in a variety of forms, such as via debit cards, credit cards, direct credits, direct debits, cash, check, money order, Internet banking, e-commerce payment networks/systems (e.g., PayPal™ Google Wallet, Amazon Payments), virtual currencies (e.g., Bitcoins), award or reward points, and/or the like.

As shown in FIG. 2, in one embodiment, the carrier system 100 may include or be in communication with one or more processing elements 205 (also referred to as processors, processing circuitry, and/or similar terms used herein interchangeably) that communicate with other elements within the carrier system 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the carrier system 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, information/data, applications, programs, program modules, scripts, source code, object code, byte code, compiled code, interpreted code, machine code, executable instructions, and/or the like. Such code may include an operating system, a database, various program modules, and/or the like. The terms database, database instance, database management system, and/or similar terms used herein interchangeably may refer to a structured collection of records or information/data that is stored in a computer-readable storage medium, such as via a relational database, hierarchical database, and/or network database.

In one embodiment, the carrier system 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, information/data, applications, programs, program modules, scripts, source code, object code, byte code, compiled code, interpreted code, machine code, executable instructions, and/or the like being executed by, for example, the processing element 205. Thus, the databases, database instances, database management systems, information/data, applications, programs, program modules, scripts, source code, object code, byte code, compiled code, interpreted code, machine code, executable instructions, and/or the like may be used to control certain aspects of the operation of the carrier system 100 with the assistance of the processing element 205 and operating system, such as a registration module, an alert module, a delivery options module, an identification module, a service schedule module, and/or the like.

As indicated, in one embodiment, the carrier system 100 may also include one or more communications interfaces 220 for communicating with various computing entities, such as by communicating information/data, content, information/data, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the carrier system 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, near field communication (NFC) protocols, Bluetooth protocols, wireless universal serial bus (USB) protocols, and/or any other wireless protocol.

Although not shown, the carrier system 100 may include or be in communication with one or more input elements, such as a keyboard input, a mouse input, a touch screen/display input, motion input, movement input, audio input, pointing device input, joystick input, keypad input, and/or the like. The carrier system 100 may also include or be in communication with one or more output elements (not shown), such as audio output, video output, screen/display output, motion output, movement output, and/or the like.

The carrier system 100 may also be configured to receive, effect, or initiate payments. Payments may be in a variety of forms, such as via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like. Such payments may be made using a variety of techniques and approaches, including through NFC technologies such as PayPass, Android Beam, Bluetooth low energy (BLE), and various other contactless payment systems. Further, such payment technologies may include PayPal Beacon, Booker, Erply, Leaf, Apple Pay, Leapset, Micros, PayPal Here, Revel, ShopKeep, TouchBistro, Vend, and/or the like.

As will be appreciated, one or more of the carrier system's 100 components may be located remotely from other carrier system 100 components, such as in a distributed system. Furthermore, one or more of the components may be combined and additional components performing functions described herein may be included in the carrier system 100. Thus, the carrier system 100 can be adapted to accommodate a variety of needs and circumstances. As will be recognized, these architectures and descriptions are provided for exemplary purposes only and are not limiting to the various embodiments.

2. Exemplary User Computing Entity

Figure 3:
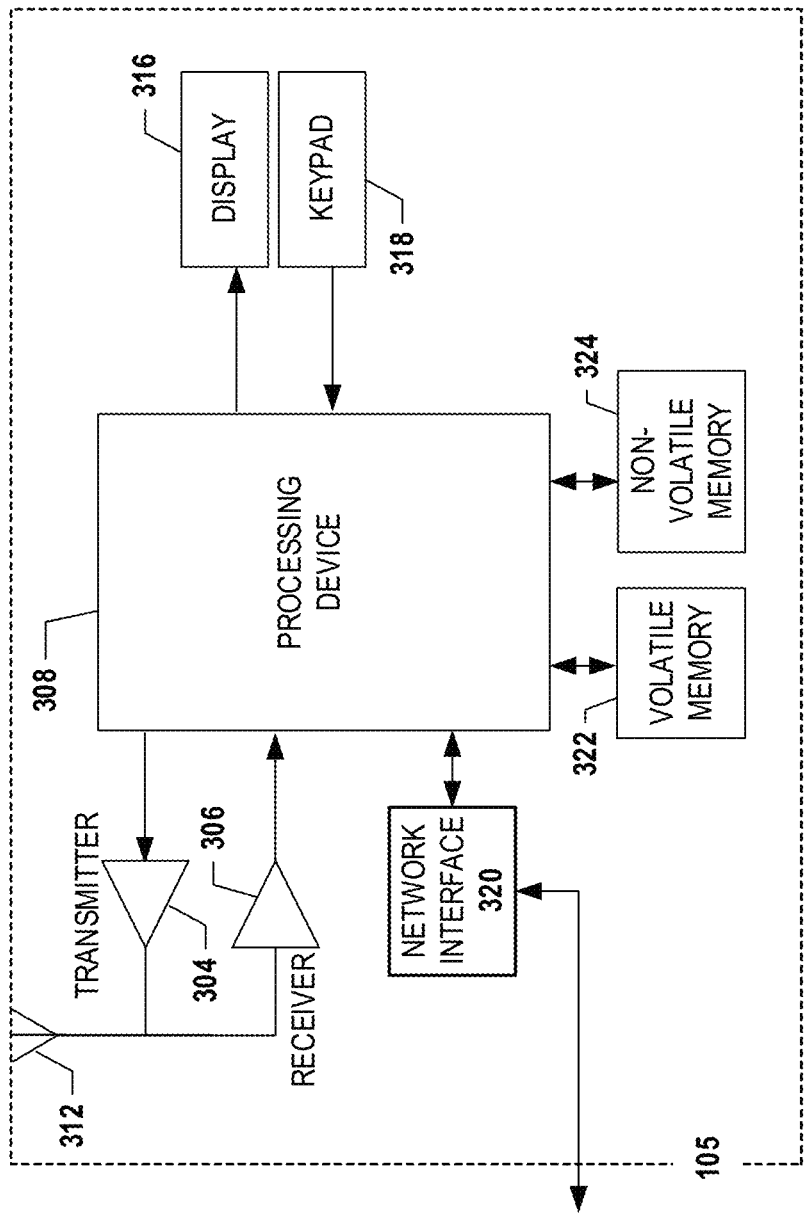
FIG. 3 is a schematic diagram of a user computing entity according to various embodiments of the present invention.

A user may be an individual, a family, a company, an organization, an entity, a department within an organization, a representative of an organization and/or person, and/or the like. A user may operate a user computing entity 105 that includes one or more components that are functionally similar to those of the carrier system 100. FIG. 3 provides an illustrative schematic representative of a user computing entity 105 that can be used in conjunction with embodiments of the present invention. User computing entities 105 can be operated by various parties, including carrier or vendor employees or representatives. As shown in FIG. 3, the user computing entity 105 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the user computing entity 105 may be capable of operating with one or more air interface standards, communication protocols, modulation types, and access types. More particularly, the user computing entity 105 may operate in accordance with any of a number of wireless communication standards and protocols, such as those described above with regard to the carrier system 100. In a particular embodiment, the user computing entity 105 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth, USB, and/or the like. Similarly, the user computing entity 105 may operate in accordance with multiple wired communication standards and protocols, such as those described above with regard to the carrier system 100 via a network interface 320.

Via these communication standards and protocols, the user computing entity 105 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 105 can also download changes, add-ons, and updates, for instance, to its firmware, software (e.g., including executable instructions, applications, program modules), and operating system.

According to one embodiment, the user computing entity 105 may include a location determining aspects, device, module, functionality, and/or similar words used herein interchangeably. For example, the user computing entity 105 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire information/data, sometimes known as ephemeris information/data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information/data can be determined by triangulating the user computing entity's 105 position in connection with a variety of other systems, including cellular towers, Wi-Fi access points, and/or the like. Similarly, the user computing entity 105 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine/identify the location of someone or something to within inches or centimeters.

The user computing entity 105 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 105 to interact with and/or cause display of information/data from the carrier system 100, as described herein. The user input interface can comprise any of a number of devices allowing the user computing entity 105 to receive information/data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 105 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the user computing entity 105. As indicated, this may include a user application that is resident on the entity or accessible through a browser or other user interface for communicating with the carrier system 100 and/or various other computing entities.

In another embodiment, the user computing entity 105 may include one or more components or functionality that are the same or similar to those of the carrier system 100, as described in greater detail above. As will be recognized, these architectures and descriptions are provided for exemplary purposes only and are not limiting to the various embodiments.

3. Exemplary Mobile Device

The mobile device 110 may be configured for receiving and storing user input received from a driver, receiving and displaying information/data received from the carrier system 100, and transmitting any received information/data to the carrier system 100 over the network 130. According to various embodiments, the various functions of the mobile device 110 described herein may be generally understood as being performed by one or more of the mobile device 110 components similar to those described in reference to the user device 105.

According to various embodiments, the mobile device 110 may be a handheld electronic device capable of information/data acquisition, such as a delivery information/data acquisition device (DIAD), pocket PC, personal digital assistant (PDA), handheld computer, smartphone, laptop, converged device, personal navigation device, computer, computing entity, mobile phone, tablet, notebook, laptop, watch, glasses, key fob, radio frequency identification (RFID) tag, ear piece, camera, wristband, input terminal, processing device, processing entity, item/device, vehicle 50, the like, and/or any combination of devices or entities adapted to perform the functions, operations, and/or processes described herein—including both wireless and wireline devices.

The mobile device 110 may include one or more components that are functionally similar to those of the user computing entity 105. For example, in one embodiment, a mobile device may include: an antenna, a transmitter, a receiver, and a processing device (e.g., one or more processors, controllers, or the like) for providing signals to and receiving signals from the transmitter and receiver, respectively. Via these features, operating in accordance with one or more communication standards and protocols, the mobile device 110 can communicate with the carrier system 100. The mobile device can also download changes, add-ons, and updates, for instance, to its firmware, software (e.g., including modules), and operating system. As discussed in greater detail below, the processing device may be configured to control the various functionalities of the mobile device 110, including receiving, storing, displaying, and transmitting information/data to and from the carrier system 100. Although not shown, the mobile device 110 may also include a battery, such as a vibrating battery pack, for powering the various circuits that are required to operate the mobile device 110, as well as optionally providing mechanical vibration as a detectable output.

The mobile device 110 can also include volatile memory and/or non-volatile memory, which can be embedded and/or may be removable. The memory can store any of a number of pieces or amount of information/data and information/data used by the mobile device 110 to implement the functions of the mobile device 110. For example, the volatile and non-volatile memory can be used to temporarily or permanently store input from external devices and/or input entered by the user via a user interface. The memory can also store content, such as computer program code for an application and/or other computer programs. For example, the memory may store computer program code for instructing the processing device to perform operations discussed above and below.

In various embodiments, the mobile device 110 may include location determining aspects, devices, modules, functionalities, and/or similar words used herein interchangeably. For example, the mobile device 110 may include outdoor positioning aspects, such as a location module adapted to acquire, for example, latitude, longitude, altitude, geocode, course, direction, heading, speed, UTC, date, and/or various other information/data. In one embodiment, the location module can acquire information/data, sometimes known as ephemeris information/data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information may be determined by triangulating the mobile device's 110 position in connection with a variety of other systems, including cellular towers, Wi-Fi access points, and/or the like. Similarly, the mobile device 110 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters. In particular embodiments, the mobile device 110 may be used to gather information/data regarding the location of the driver himself or herself, as opposed to location information/data associated with the delivery vehicle 50, which is collected (or determined) by the telematics device 102 in certain embodiments.

According to various embodiments, the mobile device 110 further includes a user interface comprising a display, which may be coupled to the processing device, and one or more input devices allowing the mobile device 110 to receive information/data, such as a keypad, touch display, barcode reader, RFID tag reader, and/or other input devices.

According to various embodiments, the mobile device 110 is configured for receiving and storing user input (e.g., via the user interface). At least a portion of the received user input is stored as delivery information/data indicative of delivery-related activities or occurrences, by using the user interface's keypad and other input devices. For example, in various embodiments, the user interface is configured to permit a driver to indicate that a particular item/product or a plurality of items/products has been delivered at a particular delivery stop.

In response to receiving user input indicating that one or more items/products have been delivered, the mobile device 110 may capture and store the received input as delivery information/data in a computer readable format. In accordance with the various features of the user interface, the stored delivery information/data may take a variety of forms. For example, user input in the form of manually entered alphanumeric text may be stored as a copy of the entered text (e.g., a manually entered tracking number, reason for a delay, location of delay, etc.).

In addition, the mobile device 110 may also store information/data received from the carrier system 100, such as information/data indicating that one or more items/products are to be delivered according to the one or more delivery services. The mobile device 110 is also configured for displaying (e.g., via the display 316) information/data received from the carrier system 100. For example, the mobile device 110 may receive and display delivery information/data from the carrier system 100 (e.g., updated instructions for a particular delivery).

4. Exemplary Vendor Computing Entity

The vendor computing entities 120 may each include one or more components that are functionally similar to those of the carrier system 100, user computing entity 105, and/or mobile device 110. For example, in one embodiment, each of the vendor computing entities may include: (1) a processor that communicates with other elements via a system interface or bus; (2) a user interface; (3) transitory and non-transitory memory; and (4) a communications interface. As noted, the vendor computing entity 120 may comprise a user interface (that can include a display device/input device coupled to a processing element) and/or a user input interface (coupled to a processing element). For example, the user interface may be a carrier or retailer application, browser, user interface, dashboard, webpage, and/or similar words used herein interchangeably executing on and/or accessible via the vendor computing entity 120 to interact with and/or cause display of information/data from the carrier system 100, as described herein. These architectures are provided for exemplary purposes only and are not limiting to the various embodiments.

5. Exemplary Vehicles

In various embodiments, a vehicle 50 (e.g., delivery vehicle) may be a manned or an unmanned tractor, truck, car, motorcycle, moped, Segway, bicycle, golf cart, hand truck, cart, trailer, tractor and trailer combination, van, flatbed truck, vehicle, drone, airplane, helicopter, barge, boat, and/or any other form of object for moving or transporting people and/or items (e.g., one or more packages, parcels, bags, containers, loads, crates, items banded together, vehicle parts, pallets, drums, the like, and/or similar words used herein interchangeably). In various embodiments, each delivery vehicle 50 may be associated with a unique vehicle identifier (such as a vehicle ID) that uniquely identifies the delivery vehicle 50. The delivery vehicle 50 may be mobile in the sense that it may be able to move from one location to another under its own power. The unique vehicle ID may include characters, such as numbers, letters, symbols, and/or the like. For example, an alphanumeric vehicle ID (e.g., "1221A445533AS445) may be associated with each delivery vehicle 50. In another embodiment, the unique vehicle ID may be the license plate, registration number painted or stickered on the delivery vehicle 50, or other identifying information assigned to and visible on the delivery vehicle 50. Moreover, in various embodiments the vehicle 50 may comprise one or more computing entities having a configuration similar to that described herein as a mobile computing entity 110. Thus, the vehicle 50 may be configured to communicate with the carrier system 100, one or more mobile computing entities 110, and/or the like.

In various embodiments, a delivery vehicle 50 may comprise one or more shelves or other cargo support features within the cargo area. For example, vertical walls defining a perimeter of the cargo area may each support one or more substantially horizontal shelves configured to support one or more items thereon. For example, the perimeter of the cargo area of a delivery vehicle 50 may define a front wall adjacent a passenger compartment, a rear wall having a door leading behind the delivery vehicle 50, a driver's side wall, and a passenger's side wall. Each of the driver's side wall and the passenger's side wall may have three or more shelves supported thereon, such that the shelves collectively define an aisle through the cargo compartment from the front wall to the back wall. In various embodiments, each of the shelves or other cargo support features may be divided into a plurality of areas, such areas may be divided by physical rigid or semi-rigid dividers, or may be divided by one or more labels identifying each area. In various embodiments, each shelf is labeled with a shelf identifier, and each area may be labeled with an area identifier, such that the combination of the shelf identifier and the area identifier collectively define unique area identifiers for each area within the vehicle 50. The labels may comprise symbols, alphanumeric character strings, and/or the like. For example, each shelf may be labeled with a letter (e.g., "A," "B," "C," and/or the like) and each area may be labeled with a number. Thus, each area may be uniquely identified based on the shelf label and the area label. For example, label A-2 may correspond to a second area identified on the shelf labeled "A."

In various embodiments, each area of a shelf may have a defined size. In various embodiments, each identified shelf area be substantially the same size, although in other embodiments each identified shelf area may have a different size. Thus, as will be described in greater detail herein, the carrier may offer logical space sizes corresponding to the size of a particular labeled shelf space.

6. Logical Space

As utilized herein, a logical space may be an area within one or more delivery vehicles 50 that may be reserved by a third party defined by one or more parameters. In various embodiments, a logical space may define (1) a size, (2) a service area, (3) a time parameter, (4) one or more limitations, and/or the like.

In various embodiments, the size of a logical space to be reserved within one or more delivery vehicles 50 may be defined as an area on one or more shelves within a delivery vehicle 50 (e.g., an area having a length and a width), a volume within the delivery vehicle 50 (e.g., a region having a length, a width, and a height), a length of shelf space within a delivery vehicle 50 (e.g., an area having a length and bound by the depth of the shelf), a volume within a cubby in a vehicle, a volume within a box in a vehicle, a volume within a cargo area in a vehicle, and/or the like. In various embodiments, the size of a logical space may correspond to one or more labeled areas within a delivery vehicle 50, such that a particular labeled area may be reserved (e.g., labeled area A-2, corresponding to a single labeled area on space "A"). Moreover, in various embodiments the logical space reserved by a vendor may be split into one or more contiguous areas (e.g., a single area encompassing a plurality of adjacent, smaller areas on a single shelf, such as, for example area A-2 and adjacent area A-3 on the same "A" shelf), and/or one or more separate, noncontiguous areas (e.g., areas located on separate shelves and/or at separate, non-adjacent areas on a single shelf).

The service area of a logical space may be indicative of the number and identity of vehicles 50 in which space is reserved. For example, the service area may be defined to encompass all delivery vehicles 50 within a particular zip code, all delivery vehicles 50 originating from a particular delivery hub, all delivery vehicles 50 servicing a particular neighborhood, and/or the like. Thus, the service area may identify the areas in which the vendor may offer one or more delivery services to customers and may correspond to those areas serviced by delivery vehicles 50 storing one or more unallocated products of the vendor therein. As will be described in greater detail herein, the logical space may encompass space in one or more additional vehicles 50 added to the previously scheduled delivery vehicles 50 for traversing the geographical area, for example, if there is insufficient unused capacity in the previously scheduled delivery vehicles 50 to accommodate the requested logical space and/or if the delivery vehicle drivers do not have sufficient time in a work day to complete any additional deliveries. For example, if delivery vehicle drivers are scheduled to work a full work shift prior to adding additional deliveries according to the one or more delivery services (e.g., same day delivery), the logical space may therefore encompass space in one or more additional vehicles 50 (operated by additional vehicle drivers) in order to provide additional labor time available to make additional deliveries according to the one or more delivery services.

The configurable time parameter may define the time during which the space is reserved within the one or more delivery vehicles 50. The time parameter may thus define one or more days (months, hours, and/or the like) during which space is to be reserved within the one or more delivery vehicles 50 as the delivery vehicles 50 traverse a delivery route or geographic area. For example, the time parameter may identify a particular day (e.g., Wednesday, Jun. 3, 2015), a number of consecutive days (e.g., Jun. 1, 2015 through Jun. 5, 2015), a number of consecutive business days (e.g., weekdays during the month of June, 2015), select days occurring during a range of dates (e.g., Wednesdays during the month of June, 2015), and/or the like.

The one or more limitations may define one or more limitations, requirements, and/or similar words used herein interchangeably for the delivery services or other similar services, as agreed upon between the vendor and the carrier. Such limitations may define, for example, the maximum amount of time the carrier is willing to dedicate to delivering items according to the one or more delivery services for the vendor. Because each delivery vehicle 50 of the carrier may be scheduled to deliver a number of allocated items stored therein to various delivery locations, the carrier may only be willing to dedicate a configurable amount of time, deliveries, stops, and/or the like (including both maximums, minimums, and/or the like) to delivering unallocated items according to the delivery service for the vendor. Thus, the one or more limitations may define a delivery maximum, indicative of the maximum number of deliveries that may be made by each delivery vehicle 50 according to the one or more delivery services each day (e.g., a maximum of 3 deliveries per day), a maximum total number of deliveries cumulative of all vehicles 50 carrying unallocated items therein (e.g., a maximum of 100 deliveries per day), and/or the like. As will be recognized, a variety of other approaches and techniques can be used to adapt to various needs and circumstances.

Moreover, the one or more limitations may indicate whether and/or how a vendor may replenish the number of items to be stored on each vehicle 50 during a particular time period. For example, if the vendor reserves a logical space for two or more days, the one or more limitations may define whether the vendor may provide additional items to replenish (e.g., restock) the one or more delivery vehicles 50 between delivery days. For example, the one or more limitations may indicate whether the carrier may restock depleted item inventories in vehicles 50 between delivery days (e.g., during a pre-load process for the vehicle). In yet other embodiments, the one or more limitations may indicate whether a vendor may replenish the number of items to be stored on each vehicle 50 during a particular delivery day. For example, the one or more limitations may indicate whether a vendor may schedule an inventory pick-up stop (e.g., at a vendor or carrier controlled locker, kiosk, retail store, shipping outlet, and/or the like) at which a delivery vehicle 50 may stop while traversing a delivery route so that the vendor may provide additional inventory to the delivery vehicle 50 that may be delivered after the inventory pick-up stop has been completed. As yet another example, the one or more limitations may indicate whether a vendor may request that two or more delivery vehicles may meet during a delivery day and transfer physical items of the item inventory between the two or more delivery vehicles in order to replenish item inventories in at least one of the two or more vehicles.

As described herein, the carrier may offer one or more logical spaces to vendors through a marketplace (e.g., accessible via a user application, browser, user interface, interface, web-portal). For example, the marketplace may be accessible to vendors through a user application, browser, user interface, interface, web-portal that generates a user interface to a representative of a vendor, and/or the like. The carrier may thus provide information regarding logical space available for vendors. For example, the marketplace may indicate that vendors may reserve logical space during particular time periods, within particular service areas, and/or the like. The availability and/or pricing of logical space may be determined based on actual and/or anticipated unused/available vehicle capacity or space capacity in one or more delivery vehicles 50.

III. EXEMPLARY SYSTEM OPERATION

With reference to FIGS. 4-8, an exemplary operations and processes for facilitating delivery according to one or more delivery services is described herein. Although various features may be described as performed by various entities, it should be understood that various features described herein may be performed by a single entity, such as a vertically-integrated vendor having self-managed delivery services for delivering items/products to customers.

1. Vendor Registration and Logical Space Reservation

Various embodiments may comprise features for receiving a request from a vendor to reserve one or more logical spaces in one or more carrier delivery vehicles 50 for one or more delivery services (and/or similar services). The request may comprise vendor information/data from the vendor indicative of the logical space parameters to be reserved. For example, the logical space parameters may define the amount of space to be reserved in each delivery vehicle 50, the service area to be covered by the one or more delivery services, and/or the time during which the delivery services are to be offered by the vendor. As used herein, a vendor may be a manufacturer, distributor, merchant, or other entity that sells or otherwise provides items/products to consumers. The vendor may enter into an agreement with a carrier, which provides transportation and logistics services to facilitate the movement of items/products from an origin to a destination, to reserve logical space in one or more delivery vehicles 50 operated by the carrier. In various embodiments, this service maybe provided via an internet-based or eCommerce user interface configured to allow one or more vendors to bid for available space within one or more vehicles. A carrier may be a traditional carrier/transporter, such as UPS, FedEx, DHL, courier services, the United States Postal Service (USPS), Canadian Post, and/or the like. However, a carrier may also be a nontraditional carrier/transporter, such as Amazon, Google, Uber, ride-sharing services, crowd-source couriers/services, Macy's, and/or the like. As used herein, an item/product may be any tangible and/or physical object. In one embodiment, an item/product may be enclosed and/or transported in one or more packages, parcels, bags, containers, loads, crates, items/products banded together, vehicle parts, pallets, drums, the like, and/or similar words used herein interchangeably.

In various embodiments, the carrier may offer logical space to vendors based on actual, historical and/or anticipated unused/available vehicle or space capacity. Thus, a carrier may only offer logical space to vendors on days in which the carrier determines and/or anticipates that there is at least a minimum amount of unused vehicle 50 capacity within delivery vehicles in one or more areas. For example, a carrier may offer logical space to vendors for one or more particular zip codes on Wednesdays during the month of June, 2015 after determining that there will be at least a minimum amount of unused vehicle capacity within delivery vehicles servicing the one or more particular zip codes on every Wednesday during the month of June 2015. The unused vehicle capacity may be in delivery vehicles 50 previously scheduled to traverse a particular delivery route in the service area, and/or may be in additional delivery vehicles 50 that may be added to the previously scheduled delivery vehicles 50 on a particular day to accommodate one or more vendor requests to reserve logical space in delivery vehicles 50 operating in the service area. For example, if a carrier anticipates that all vehicles 50 operating in the service area will be operating at 100% capacity (i.e., there is no unused vehicle capacity in these vehicles), the carrier may add one or more additional delivery vehicles 50 to operate in the service area to accommodate the vendors' request to reserve logical space. In such instances, the carrier may re-allocate a portion of the items scheduled to be loaded into the vehicles 50 previously scheduled vehicles among the additional delivery vehicles 50 (e.g., such that each vehicle is operating at less than 100% capacity such that there is unused space in each of the vehicles) and/or the carrier may allocate all of the logical space reserved by one or more vendors into the newly added vehicles 50.

Moreover, in various embodiments, the carrier may determine appropriate pricing for the logical space based at least in part on the determined and/or anticipated unused vehicle 50 capacity during particular time periods. For example, logical space for a particular service area on Tuesdays during the month of June 2015 may be offered according to a first pricing structure, while logical space for the particular service area on Wednesdays during the month of June 2015 may be offered according to a second pricing structure, based at least in part on the anticipated vehicle 50 capacity. Similarly, logical space for a first service area may be offered according to a first pricing structure, while logical space for a second service area may be offered according to a second pricing structure, based at least in part on actual and/or anticipated unused vehicle 50 capacity for delivery vehicles servicing these service areas. As yet another example, logical space in areas and/or during times when one or more additional vehicles 50 must be added to operate in the service area to accommodate the request for logical space may be offered at a third pricing structure, which may offset the costs of operating additional vehicles 50 on one or more days. In various embodiments, the pricing structure may be determined based on a combination of features, such as the service area and/or time, and may be based at least in part on determined and/or anticipated unused/available vehicle or space capacity.

Accordingly, prior to offering logical space to vendors and/or after receiving a request to reserve logical space, the carrier system 100 may determine the anticipated and/or actual amount of unused space in various delivery vehicles. In instances in which one or more additional delivery vehicles 50 must be added to accommodate the request to reserve logical space, the carrier system 100 may additionally determine the number of additional vehicles 50 that must be added to operate in the service area. In various embodiments, after receiving a request to reserve logical space in a particular geographical area, the carrier system 100 may identify the plurality of vehicles associated with the selected geographical area, as discussed herein.

In various embodiments, anticipated unused/available vehicle or space capacity may be based at least in part on historical information/data indicative of a number of deliveries received by (or picked up from) one or more addresses or nearby addresses, typical days of delivery to one or more addresses or nearby addresses, the type of location of one or more addresses or nearby addresses (e.g., residential or commercial), scheduled pickups, and/or the like. In various embodiments, the historical data may comprise historical utilization data indicative of the amount of space historically utilized in one or more delivery vehicles. For example, the historical utilization data may indicate that delivery vehicles operating in a particular delivery area are historically 85% filled with packages on a particular day and/or during a particular time frame (e.g., during the first week of June). The carrier system 100 may thus utilize this data to calculate an estimated and/or predicted amount of space that may be reserved as logical space in the one or more delivery vehicles 50 based on the estimated amount of unused vehicle capacity (e.g., in the previous example, vehicles in the particular delivery area have 15% unused vehicle capacity).

In various embodiments, anticipated unused/available vehicle or space capacity may be determined based at least in part on dynamic information/data indicative of historical, actual (real-time), and/or forecasted (predicted) shipments (e.g., shipments with a forecasted delivery date, a scheduled shipment, a planned delivery, and/or the like) to be delivered to one or more particular addresses. Anticipated and/or actual unused/available vehicle or space capacity may be determined for one or more time periods (e.g., for a particular day, hour, minute, week, month, year, and/or the like). This information/data is sometimes referred to as package level detail (PLD) data, which may be stored in a PLD database and updated as a shipment is received and transported through a carrier's network to a destination address. In various embodiments, the historical data comprises data regarding previously shipped and/or previously delivered items shipped according to one or more delivery services. Actual shipments may comprise shipments scheduled to be delivered according to one or more delivery services. In various embodiments, the dynamic information/data includes information/data for forecasted shipments and may include a ship date, an origin address, destination address, service level, a forecasted delivery date, a unique identifier (e.g., a tracking number), shipment dimensions, and/or the like. Various systems and methods for determining actual and/or anticipated unused vehicle capacity based on historical information/data and/or dynamic information/data are described in co-pending U.S. patent application Ser. No. 13/828,652, filed Mar. 14, 2013 and entitled "Systems and Methods for Synchronized Delivery," which is incorporated herein by reference in its entirety.

As a specific example for determining anticipated unused/available vehicle or space capacity, the carrier system 100 may determine the interior volume of each delivery vehicle 50, for example, by accessing a vehicle database containing vehicle data identifying, among other things, the interior volume associated with one or more delivery vehicles 50 operated by the carrier. The volume of packages being transported inside of the delivery vehicle 50 may be determined by, for example, aggregating PLD data obtained from various different sources (e.g., the PLD database) at various different times throughout the delivery cycle. The PLD data may include (1) billing data provided by a customer at the time he or she is placing a shipping order (e.g., indicative of the dimensions, weight, and/or contents of the package); (2) scan data obtained when a package is scanned as the package is loaded and/or unloaded from a vehicle 50 during transportation by the carrier; and/or (3) dimensional data indicating the height, width, and/or length of the package obtained, for example, when the package is scanned by a dimensional scanner at one or more instances during transportation of the package by the carrier. Upon receipt of the PLD data for packages to be loaded onto a particular vehicle 50, the carrier system 100 may divide the total volume of the packages by the interior volume of the vehicle 50 in order to determine the anticipated utilization data for the vehicle 50, indicative of the anticipated amount of space occupied by packages in the vehicle 50. The unused/available vehicle or space capacity may thus be determined by subtracting the utilization data from the total volume of the vehicle 50.

In various embodiments, the carrier system 100 may assign packages to a delivery vehicle 50 prior to the delivery vehicle 50 being physically loaded with packages for delivery. For example, the carrier system 100 may estimate a date on which one or more particular packages are to be loaded onto a delivery vehicle 50 (e.g., the estimated delivery date), thereby identifying the packages to be loaded onto the vehicle 50 on a particular date such that anticipated utilization data may be calculated for the vehicle 50. After identifying the one or more packages to be loaded onto the delivery vehicle 50 on a particular date, the carrier system 100 may access the PLD data for each of the packages to calculate the anticipated unused/available vehicle or space capacity for the delivery vehicle 50 on the particular date. By comparing the interior volume of the vehicle 50 against the total volume of packages scheduled to be loaded on the vehicle 50 that day (e.g., calculated by summing the package volumes of each of the identified packages to be loaded into the vehicle), the carrier system 100 may determine the anticipated unused/available vehicle or space capacity for the delivery vehicle 50. The carrier system 100 may repeat this process for a plurality of delivery vehicles 50 to thereby determine the amount of the anticipated unused/available vehicle or space capacity for delivery vehicles 50 in one or more areas.

However, as noted above, upon receipt of one or more requests to reserve logical space that cannot be accommodated using the vehicles in the active delivery fleet previously scheduled to traverse various delivery routes due to space limitations and/or other vendor requests (e.g., requests to have one or more vehicles containing a physical item inventory in a particular region of interest within the service area during a particular time period), the carrier system 100 may determine the number of additional delivery vehicles that must be added to operate in the service area to accommodate the one or more requests to reserve logical space. As noted above, upon adding the one or more additional vehicles 50 to operate in the service area, the carrier system 100 may allocate all of the logical space reserved to the additional vehicles 50 such that the additional vehicles 50 are only scheduled to carry item inventories for one or more vendors in reserved logical spaces. Alternatively, the carrier system 100 may re-allocate a portion of the plurality of items scheduled to be delivered by the previously scheduled delivery vehicles 50 to the newly added delivery vehicles 50 to increase the amount of unused vehicle capacity in all vehicles 50 scheduled to deliver items in one or more areas.

In various embodiments, the carrier may offer logical space to vendors through a marketplace. In various embodiments, the marketplace may be available to vendors and/or representatives of vendors through an Internet-based portal. In various embodiments, the carrier system 100 may store logical space availability information/data indicative of logical space that may be available to vendors. Such availability information/data may define the service/geographic/territory areas in which unused vehicle capacity is available (e.g., one or more zip codes, neighborhoods, cities, towns, delivery routes, and/or the like); the time during which the unused vehicle capacity is available (e.g., specific days, consecutive days, and/or the like); the amount of unused vehicle 50 capacity available (e.g., volume within delivery vehicles, area on a within delivery vehicles 50, length of within delivery vehicles, and/or the like); the number of additional delivery vehicles 50 that can be added to operate in the service area; and/or the like. In various embodiments, the logical availability information/data may be indicative of one or more pre-existing reservations by one or more vendors.

The carrier system 100 may provide a user interface for the marketplace configured to present the logical space availability information/data to users (e.g., vendors and/or vendor representatives) through the Internet-based portal and via a vendor computing entity 120, user computing entity 105, and/or the like. Accordingly, the marketplace may comprise an Internet-based portal accessible by a vendor or vendor representative that may provide information regarding the availability of logical space. For example, the marketplace may present information regarding the dates and/or service areas in which logical space is available (e.g., via a calendar-based user interface). In various embodiments, the marketplace may provide a user interface configured to permit one or more vendors to bid on available shelf space.

In various embodiments, the Internet-based portal may be publicly available. Alternatively, the Internet-based portal may require a vendor to register with the carrier system 100 prior to accessing the Internet-based portal.

In yet other alternatives, the carrier may provide specific inquiries to one or more vendors regarding available logical space. Thus, the carrier may provide information regarding the availability and pricing of logical space directly to one or more vendors, and request that the vendor provide information regarding whether the vendor would like to reserve logical space.

Figure 4:
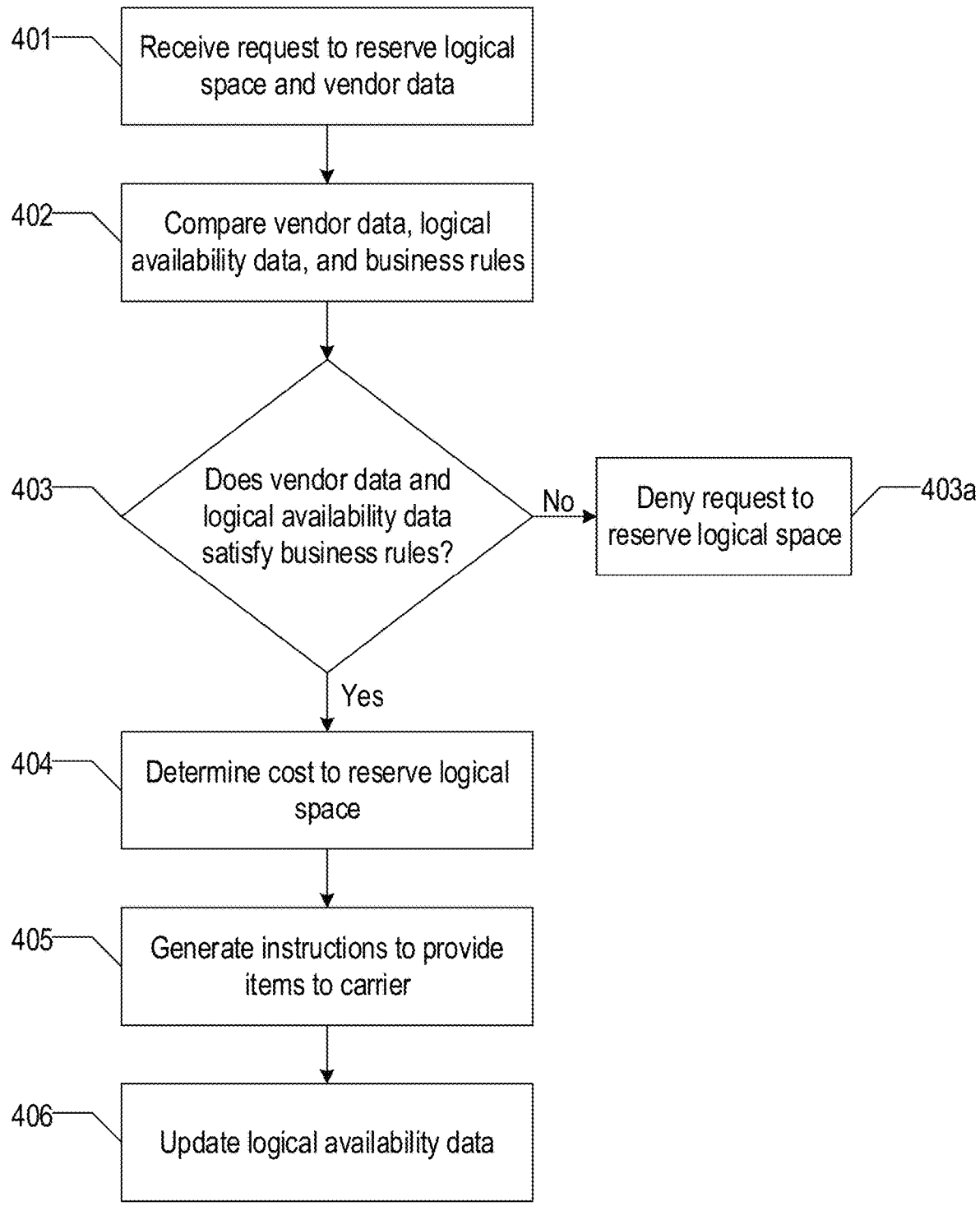
FIG. 4 is a flow chart illustrating various steps in reserving space within one or more delivery vehicles according to various embodiments of the present invention.

FIG. 4 illustrates various steps in receiving a request from a vendor (e.g., operating a computing device) to reserve logical space in one or more carrier delivery vehicles. As discussed herein, logical space may be defined by a plurality of parameters comprising size parameters, service area (geographic area) parameters, time parameters, limitations, and/or the like. Thus, a request to reserve logical space may comprise information/data corresponding to each of the parameters defining logical space to be reserved. As discussed herein, such a request may comprise vendor information/data defining (1) timing information/data corresponding to the time parameter of logical space, (2) space size information/data corresponding to the size parameter of logical space, (3) territory information/data corresponding to the service area parameter of logical space, and/or (4) limitation information/data corresponding to the one or more limitations of logical space. As shown at Block 401 of FIG. 4, the carrier may receive vendor information/data indicative of various service features of the delivery service to be offered by the vendor via the carrier system 100. Such vendor information/data may be received via the marketplace and/or another interface (e.g., a user application, browser, user interface, interface, web-portal, and/or similar words used herein interchangeably) provided by the carrier system 100, such that the information/data received via the interface may be transmitted to the carrier system 100 for further analysis and/or storage. In various embodiments, the interface may be accessible by the vendor and/or a representative of the vendor via a user computing entity 105 and/or a vendor computing entity 120, and may be configured to receive user input. As will be described in greater detail herein, the interface (e.g., the interface of the marketplace) may be configured to generate a graphical display comprising information/data generated based at least in part on the user input received by the interface. In various embodiments, the carrier and/or a representative of the carrier may additionally and/or alternatively receive the vendor information/data via in-person discussions, teleconference, facsimile, email, and/or the like. Accordingly, the carrier system 100 may be configured to receive the vendor information/data via user input from the carrier and/or a representative of the carrier.

The vendor information/data received by the carrier may define various parameters of a logical space to be reserved and thus may comprise (1) timing information/data, (2) space size information/data, (3) service/geographic/territory area information/data, (4) limitation information/data, and/or the like. Each of these portions of the vendor information/data may define a particular aspect of the logical space within delivery vehicles reserved for a vendor and thus may correspond to a particular parameter of the logical space.

The timing information/data may indicate one or more time periods during which the one or more shipping services are to be offered by the vendor, and consequently the one or more periods of time during which the vendor wishes to reserve space within one or more delivery vehicles. Thus, the timing information/data may correspond to the time parameter of a logical space. The timing information/data may thus indicate the days during which one or more delivery vehicles 50 will contain an inventory of items/products for the vendor. For example, the timing information/data may indicate that a vendor wishes to offer one or more delivery services every day that carrier-operated delivery vehicles 50 traverse a particular area between July 1 and July 31. The timing information/data may indicate specific days during the one or more time periods for offering delivery services. For example, a vendor may indicate that one or more delivery services should be offered every Monday during the period of time between July 1 and July 31. Accordingly, the vendor may provide one or more delivery services of one or more items/products during vendor-identified time periods. For example, the vendor may provide on demand, same-day, and/or other delivery services in identified geographical areas during a period of time immediately following a new item/product launch, or during another specified period of time.

The item/product size information/data may be indicative of the amount of space to be reserved within each of one or more delivery vehicles 50 for the unallocated items/products to be placed within the item/product inventory in each of the one or more delivery vehicles 50 on behalf of the vendor. Thus, the item/product size information/data may indicate the amount of space necessary to store an unallocated inventory of one or more physical items/products within a particular delivery vehicle 50, and may correspond to the size parameter of a logical space to be reserved. For example, the item/product size information/data may be indicative of an item description, item dimensions (e.g., length, width, and height, volume, and/or the like), item weight, and/or the like. The unallocated item/product inventory contained within each of the one or more delivery vehicles 50 comprises items/products loaded into each of the one or more delivery vehicles 50 before the items/products have been ordered. Accordingly, when the items/products of the unallocated item/product inventory are loaded onto the delivery vehicle 50, the items/products are not scheduled to be delivered to a destination location.

In various embodiments, the item/product size information/data may indicate the type of item/product or items/products to be stored in inventory within each of the one or more vehicles 50, and the quantity of each item/product to be stored in the one or more vehicles 50. Moreover, the item/product size information/data may specify the size or dimensions of each type of item/product to be stored therein (e.g., footprint, volume, and/or weight of each type of item) such that an estimated total amount of space necessary to store the vendor-supplied items/products may be determined. For example, if each item/product is to be provided in an individual shipping container (e.g., a box), the footprint of the shipping container (the overall area occupied by the item/product in a space) may be provided in the item/product size information/data.

In various embodiments, the item/product size information/data may additionally specify whether a physical divider is necessary to ensure that the space within the vehicle 50 is reserved for the vendor. For example, a physical divider may comprise a rigid and/or semi-rigid panel configured to provide separation between the reserved space and the remainder of the delivery vehicle 50, a container within which each of the plurality of items/products are to be placed within the delivery vehicle 50, a dispenser within which each of the plurality of items/products are to be placed within the delivery vehicle 50, a net, a speed-rack, and/or the like. In various embodiments, either of the vendor and/or the carrier may specify whether a physical divider is necessary, and accordingly the carrier system 100 may be configured to receive input indicating whether a physical divider is necessary. In various embodiments, when a physical divider is utilized, the space occupied by the divider itself may be included in the space to be reserved for the vendor. For example, the actual items/products to be stored within each of the delivery vehicles 50 may collectively occupy 2 cubic-feet, however the dispenser utilized to store the items/products may occupy 3 cubic-feet, and accordingly the amount of space to be reserved for the vendor may be 3 cubic-feet.

The item/product size information/data may additionally comprise disposal information/data indicative of the vendor's instructions for disposing of the items/products after the expiration of the one or more time periods during which the items/products are to be stored in an inventory within each of the delivery vehicles 50. Ownership of the items/products placed within the inventory of the one or more delivery vehicles 50 may remain with the vendor until the items/products are delivered to a destination location in accordance with an order received by the vendor, and thus the carrier may maintain possession of the one or more items/products according to a bailment between the carrier and the vendor. Acting as a bailor, the vendor may thus provide instructions to the carrier (e.g., via the carrier system 100), acting as a bailee, for disposing of the items/products after the expiration of the one or more time periods specified in the timing information/data. For example, the disposal information/data may indicate that (1) the carrier is to return any items/products remaining after the expiration of the one or more time periods to the vendor, and thereby relinquish possession of the one or more items/products to the vendor and end the bailment, (2) the carrier is to remain the bailee, and/or otherwise maintain possession of the one or more items/products to facilitate future agreements for maintaining an inventory of items/products on each of a plurality of delivery vehicles 50, or (3) the carrier is to destroy or otherwise dispose of the items.

The territory information/data may define the delivery service region, and thus indicate the geographical area in which the delivery service is to be offered and consequently the identity and quantity of delivery vehicles 50 in which the space is to be reserved. The territory information/data may thus correspond to the service area parameter of a logical space. Accordingly, the carrier may determine the vehicles 50 and/or service routes for which an inventory of the one or more items/products is to be maintained such that the delivery services may be performed over the entirety of the territory specified by the vendor. Accordingly, in defining the territory information/data, the vendor may specify one or more particular geographical regions (e.g., a country, a state, a county, a zip code, a city, a neighborhood and/or the like) within which the one or more delivery services are to be offered. In various embodiments, the vendor may specify the one or more geographical regions within which to offer the one or more delivery services by entering the identity of a region via user input. For example, the vendor may specify a particular zip code, city name, county name, state name, country name, and/or the like via a text-based user input. In various embodiments, the vendor may draw a two-dimensional bounded area on a map generated via a graphical user interface to indicate the region in which the one or more delivery services are to be offered. The vendor may alternatively and/or additionally specify one or more particular vehicle service areas for which the one or more delivery services are to be offered. As used herein, a vehicle service area comprises a geographical area assigned to a delivery vehicle 50 in which the delivery vehicle 50 operates, and the plurality of destination locations with the geographical area. In various embodiments, the vehicle service areas assigned to a plurality of vehicles 50 may at least partially overlap. Accordingly, a vehicle service area comprises a service route along which a particular delivery vehicle 50 is scheduled to traverse on a particular day, including all of the destination locations at which the delivery vehicle 50 is scheduled to stop and all of the destination locations passed by the delivery vehicle 50 while the vehicle 50 is travelling between scheduled destination location stops, as well as those areas (and the associated destination locations) for which the delivery vehicle 50 is assigned, but in which there are no pre-established delivery stops for a particular day. As a non-limiting example, a vehicle service area may comprise the route along which a particular delivery vehicle 50 is scheduled to traverse on a particular day, and the area within a configurable distance of the scheduled route. As another non-limiting example, a vehicle service area may comprise the service route along which a particular delivery vehicle 50 is scheduled to traverse on a particular day, and those areas traversed by the delivery vehicle 50 on previous days. In various embodiments, the vehicle service area assigned to each of a plurality of vehicles 50 may remain unchanging over several days (even if the route scheduled to be travelled by the delivery vehicle and/or the location of scheduled delivery stops for the delivery vehicle changes daily). In alternative embodiments, the vehicle service area assigned to each of a plurality of vehicles 50 may correspond to the service route scheduled to be travelled by the delivery vehicle 50, and accordingly the vehicle service area may change as the service route changes. The service route may change based at least in part on the number and/or location of scheduled delivery stops within a geographical area for a particular day, and accordingly the vehicle service area may change based on the number and location of delivery stops assigned to a delivery vehicle 50 on a particular day.

As another example, the vendor may specify one or more carrier hub facilities from which the one or more delivery services are to be offered. Thus, each of the delivery vehicles 50 that operate out of an identified carrier hub facility may be identified to provide the one or more delivery services.

Moreover, in various embodiments, the territory data may indicate that the vendor requests that one or more delivery vehicles be within one or more regions of interest within the service area during a particular time. For example, the territory data may indicate that the vendor requests that one or more delivery vehicles be located within a particular neighborhood between the hours of 2:00 PM and 5:00 PM. In response, the carrier system 100 may determine whether one or more scheduled delivery routes may be modified such that one or more vehicles are within the one or more regions of interest. Moreover, in various embodiments, the carrier system 100 may determine whether one or more additional vehicles 50 must be added to traverse the delivery service area such that at least one of the one or more vehicles is within the region of interest within the delivery service area during the specified time periods.

In various embodiments, upon receipt of territory data, the carrier may determine the number of vehicles 50 that service the identified delivery service region. Such information/data may therefore be indicative of the number of vehicles 50 in which inventory is to be stored. Moreover, the number of vehicles 50 servicing the identified delivery service region may vary over time (e.g., depending on the number of actual and/or anticipated delivery stops to be made on a particular day). Accordingly, the determination of the number of vehicles 50 that service the identified delivery service region may be based at least in part upon the size and location of the identified delivery service region, as well as the date on which the delivery services are to be offered. In embodiments in which the carrier system 100 provides information/data regarding the availability of logical space via a marketplace (e.g., via an Internet-based portal), the carrier system 100 may be configured to determine the actual and/or estimated number of vehicles 50 that will be servicing the identified delivery service area and to update the user interface associated with the marketplace to reflect the determined total number of vehicles 50 in which an item inventory will be stored in order to offer the delivery service within the service area.

Moreover, the vendor information/data may comprise limitation information/data indicative of one or more limitations to be applied to the one or more delivery services offered by the vendor. As discussed herein, such limitations may be provided in order to limit the maximum amount of time that the carrier must dedicate to providing delivery services for the vendor. Thus, the limitation information/data may define a delivery maximum, indicative of (1) the maximum number of deliveries that may be made by each delivery vehicle 50 according to the one or more delivery services in a particular day (e.g., a maximum of 3 deliveries made by each vehicle per day) and/or (2) the maximum number of cumulative deliveries made by all delivery vehicles 50 according to the one or more delivery services for a particular vendor (e.g., a maximum of 100 deliveries made for a particular vendor, regardless of the identity of the delivery vehicle making the deliveries, per day).

Moreover, the limitation information/data may define replenishing limitations indicative of whether the vendor may replenish the number of items stored on each vehicle 50 during a particular time period. For example, if the vendor reserves a logical space for two or more days, the one or more limitations may define whether the vendor may provide additional items to replenish (e.g., restock) the one or more delivery vehicles 50 between delivery days. In yet other embodiments, the one or more limitations may indicate whether a vendor may replenish the number of items to be stored on each vehicle 50 during a particular delivery day. Thus, in the absence of the ability to replenish the number of items stored on each vehicle 50, the one or more delivery services may be offered for the shorter amount of time determined by either (1) the timing information/data or (2) when the inventory within the delivery vehicles 50 is exhausted.

In various embodiments, upon receipt of the vendor information/data, the carrier system 100 may determine whether to approve or deny the vendor's request to reserve logical space and thereby offer one or more delivery services based at least in part on the received vendor information/data. Such determination may be made based at least in part on a comparison between the vendor information/data, logical availability information/data, and one or more business rules as shown in Block 402 of FIG. 4. The logical space information/data may be indicative of existing vehicle space reservations as well as determined and/or anticipated unused vehicle capacity (which may include available additional vehicles that may be added to operate in the service area to accommodate the request to reserve logical space). Thus, the carrier system 100 may be configured to determine whether, collectively, all of the existing reservations (e.g., reservations made by other vendors) and the currently requested reservation satisfy all of the applicable business rules, as shown in Block 403 of FIG. 4. As shown in Block 403a, upon a determination that the vendor information/data and the logical space availability information/data, collectively, do not satisfy the one or more business rules, the carrier system 100 may deny the vendor request to reserve space within one or more carrier delivery vehicles 50.

The one or more business rules may define a maximum and/or minimum amount of space in each of the plurality of delivery vehicles 50 that may be reserved by one or more vendors. For example, the one or more business rules may define a maximum volume that may be reserved for one or more delivery services. In various embodiments, the maximum volume may be a maximum total volume that may be reserved in a vehicle 50, regardless of the number of vendors reserving space therein. Such business rules may be defined to ensure that normal services provided by the carrier are not impeded by the amount of space reserved for the one or more delivery services provided on behalf of the vendor. For example, because the carrier may be required to transport items/products from a configurable origin to a configurable destination in accordance with traditional shipping services, the business rules may ensure that sufficient space within each of the plurality of vehicles 50 remains available to transport items/products shipped according to a traditional shipping service.

Upon a determination that the vendor information/data and the logical space availability information/data, collectively, satisfies the one or more business rules, the carrier system 100 may determine a cost to be charged to the vendor in exchange for the agreement to reserve space within each of a plurality of delivery vehicles 50 during a specified time period and to act as a bailee or otherwise maintain possession of the physical item inventory for the vendor, as shown in Block 404 of FIG. 4. In various embodiments, the cost to be charged to the vendor may be determined based at least in part on the vendor information/data. For example, the cost may be determined based at least in part on the number of days during which the carrier is to reserve a space within a plurality of delivery vehicles 50, the size of the space to be reserved in each of the plurality of delivery vehicles 50, and/or the number of vehicles 50 in which the carrier is to reserve a space. Moreover, in various embodiments, the cost to be charged to the vendor may be determined based in part on the time of time-of-year during which the space is to be reserved. For example, reserving space within one or more delivery vehicles 50 between December 1 and December 24 may be more costly than reserving a space within one or more delivery vehicles 50 during the month of July because the volume of items/products transported by the carrier, and accordingly the volume in each of the delivery vehicles 50 needed for normal delivery activity of the carrier, may be dependent on the time of year. Moreover, the cost to be charged to the vendor may be based at least in part on the number of additional vehicles 50 that must be added to operate in the service area in order to accommodate the request to reserve logical space.

Upon approval of the vendor request to reserve space within one or more delivery vehicles 50 and to maintain an item/product inventory within each of the one or more delivery vehicles 50, the carrier system 100 may provide instructions to the vendor indicating how to provide the carrier with the one or more items/products to be maintained in inventory on the one or more delivery vehicles 50 as shown in Block 405. For example, in instances in which the vendor information/data is provided to the carrier system 100 via an interface, the interface may generate a graphical user interface providing instructions to the vendor. The instructions may additionally and/or alternatively be provided via any of a variety of forms of communication, such as via teleconference, email, in person meeting, and/or the like.

Moreover, the carrier system 100 may be configured to update the logical availability information/data to reflect the reservation of space within one or more delivery vehicles 50 in accordance with the provided vendor information/data. Thus, future requests to reserve space within one or more delivery vehicles 50 may be reviewed to determine whether, collectively, the future request and the updated logical availability information/data satisfy the one or more business rules.

2. Receiving and Distributing Items/Products to Delivery Vehicles

Figure 5:
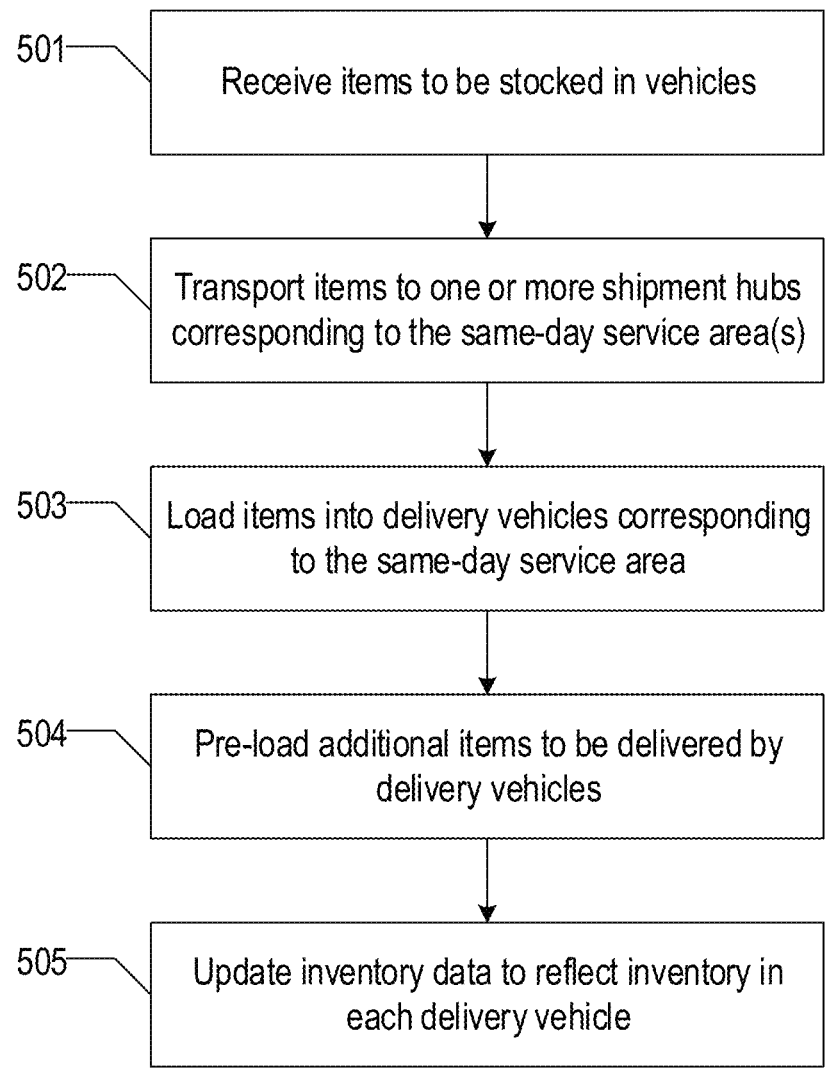
FIG. 5 is a flow chart illustrating various steps in receiving and disseminating items/products to various delivery vehicles to be maintained in an unallocated item/product inventory according to various embodiments of the present invention.

After reserving logical space within one or more delivery vehicles 50 in which to maintain an inventory of items/products owned by the vendor, the vendor may provide the items/products to the carrier. Accordingly, as shown in FIG. 5, the carrier may thus receive the items/products from the vendor and disseminate the items/products to the delivery vehicles 50 according to the vendor information/data. In various embodiments, the process for receiving and disseminating items/products may be repeated any number of times for a vendor. For example, the vendor may provide additional items/products in order to replenish an inventory within one or more delivery vehicles 50 during the one or more time periods specified in the vendor information/data. In various embodiments, the vendor may provide the physical item inventory to the carrier for dissemination into a plurality of vehicles based at least in part on instructions provided by the carrier (e.g., via the carrier system 100 providing instructions through a user interface) after reserving logical space in the one or more vehicles. For example, the carrier (e.g., via the carrier system 100) may indicate the number of vehicles scheduled to traverse the geographical area, and provide instructions to the vendor to provide a minimum or specific number of items to be distributed among the plurality of vehicles scheduled to traverse the service area such that at least a minimum number of items are placed in each vehicle 50. In various embodiments, the carrier may provide instructions and/or recommendations (e.g., via the carrier system 100) indicative of a proposed distribution of items among the plurality of vehicles. For example, the carrier may provide instructions and/or recommendations via the carrier system 100 generating a graphical user interface indicating the vendor is most likely to sell items to be distributed in one or more areas of interest within the service area. Thus, the carrier (e.g., via the carrier system 100) may provide a recommendation that the vendor provide additional items to be stored within delivery vehicles 50 traversing the one or more areas of interest.

Moreover, in various embodiments, the carrier (e.g., via the carrier system 100 generating a graphical user interface) may provide instructions for how the vendor should provide items to be distributed among the plurality of vehicles. For example, the carrier (e.g., via the carrier system 100) may provide instructions to the vendor to send separate groups of products corresponding to each vehicle within the geographical area. For example, the carrier (e.g., via the carrier system 100) may instruct the vendor to send individual packages each containing an item inventory for a particular vehicle 50 to be sent to a particular destination address corresponding to the delivery vehicle 50 (e.g., providing an address corresponding to the vehicle identification number and/or the delivery route associated with the vehicle). Each package may contain a single type of item and/or may contain a collection of different items to be included in the item inventory in each vehicle 50.

As yet another example, the carrier (e.g., via the carrier system 100) may instruct the vendor to provide a bundle of items to a particular location such that the items contained in the bundle may be distributed among the plurality of vehicles 50 by the carrier. For example, the vendor may ship a bundle of items (e.g., a pallet of items) to a carrier hub, where carrier personnel break down the bundle of items and disseminate the items into the plurality of delivery vehicles 50 in accordance with instructions provided by the vendor. In such embodiments, the carrier may inventory each of the items received at the hub or other carrier facility, and provide inventory information/data indicative of the number and types of items received at the carrier facility. Such inventory information/data may be stored via the carrier system 100.

In various embodiments, the carrier (e.g., via the carrier system 100) may instruct the vendor to label each of the plurality of items with an item identifier label in order to facilitate picking the proper item for delivery. For example, each item may be labelled with a machine-readable and/or human-readable label indicating the identity of the item. At the time of delivery, the carrier personnel may identify the proper item for delivery based at least in part on the item identifier label.

As shown in FIG. 5, at Block 501 the carrier receives the items/products to be maintained in inventory in the delivery vehicles 50. In various embodiments, the carrier may receive a configurable number of items/products as specified in the vendor information/data that will be maintained in inventory within the one or more vehicles 50, or the carrier may receive additional items/products to be used by the carrier to replenish inventory within the one or more delivery vehicles 50 as the inventory within the vehicles 50 is depleted. The items/products may be one or more different item/product types, as defined in the item/product information/data. Accordingly, the vendor may offer one or more delivery services for the one or more item/product types provided to the carrier to be maintained in the one or more delivery vehicles 50.

In various embodiments, the vendor may ship the item inventory in one or more separate shipments to the carrier. For example, the vendor may ship the item inventory in a plurality of shipments corresponding to each vehicle in which the physical item inventory is to be stored. Each of the plurality of shipments may be individually addressed to a particular vehicle (e.g., identified based on a vehicle identifier, a route identifier, and/or the like), such that the carrier need only place the items in each of the plurality of shipments into a corresponding vehicle. In various embodiments, the vendor may provide one or more shipments each containing a number of physical items to be placed in inventory in a plurality of vehicles. Thus, the carrier may divide the items in each of the plurality of shipments into a plurality of different vehicles after receipt of the items.

At step 502, the carrier transports the items/products to one or more shipment hubs from which the one or more delivery vehicles 50 operate. For example, in instances in which the vendor has identified a particular delivery hub from which to offer one or more delivery services, all of the items/products received by the carrier may be transported to the single delivery hub. As another example, in instances in which the vendor has identified vehicles 50 operating from different delivery hubs for providing the one or more delivery services, a subset of the items/products received by the carrier may be transported to each of the delivery hubs from which the identified vehicles 50 operate. Thus, each delivery hub from which an identified delivery vehicle 50 operates may receive items/products to be placed in an item/product inventory on the identified delivery vehicles 50.

At step 503, the items/products are loaded onto the delivery vehicles 50 corresponding to the delivery service area. In various embodiments, the space reserved for items/products to be placed in inventory on the delivery vehicles 50 may be designated by a physical barrier (e.g., a wall, a fence, grate, dispenser, and/or the like) at least partially surrounding the area to be reserved for the item/product inventory. In such embodiments, the physical barrier may be placed and/or secured within the delivery vehicle 50 to designate the space reserved for the vendor items, and the one or more items/products may be placed within and/or adjacent the physical barrier. However, in various embodiments, the space reserved for the item/product inventory may be designated by the items/products themselves, such that the items/products are simply placed within the vehicle 50.

In various embodiments, the items may distributed equally among each of the plurality of vehicles 50 (e.g., such that the same number of items are placed in each of the vehicles). Alternatively, the items may be distributed unequally, such that a different number of items are placed in each of the plurality of vehicles 50. The items may be distributed based at least in part on (1) the amount of space available in each of the plurality of vehicles 50, (2) instructions provided by the vendor, and/or the like. For example, the items may be distributed among various vehicles 50 such that a larger item inventory (e.g., larger number of items) may be placed in vehicles 50 travelling along delivery routes through one or more regions of interest in the delivery service area. In various embodiments, the vendor may provide instructions indicating that a larger number of items are to be placed in specific vehicles 50. In various embodiments, the vendor may specify that vehicles 50 traveling to particular regions of interest are to receive a larger number of items than other vehicles 50. In various embodiments, the vendor may provide such instructions with reference to specific vehicle identifiers (e.g., specifying that one or more specific vehicles are to receive a larger item inventory) and/or with reference to the particular regions of interest (e.g., specifying that vehicles traversing a particular region of interest are to receive a larger item inventory).

Block 504 indicates that additional items/products to be delivered along the service route may be loaded into the vehicle 50 according to a preload process as is known in the art. Items/products to be delivered according to a traditional delivery scheme may be placed within the delivery vehicle 50 such that the items/products do not encroach on the space reserved by the vendor as defined by the logical space reserved. Although illustrated in FIG. 5 as occurring after the item/product inventory is placed within each of the delivery vehicles 50, it should be understood that the preload process may proceed prior to loading the item/product inventory into the delivery vehicles 50.

As indicated at Block 505, the carrier system 100 may generate inventory information/data to reflect the location of the various items. For example, the inventory information/data may indicate the number and type of items/products stored in the unallocated inventory in each of the plurality of delivery vehicles 50. In various embodiments, the inventory information/data may comprise or be associated with vehicle service area information/data indicative of the geographical areas serviced by each delivery vehicle 50. Accordingly, the inventory information/data, collectively with the vehicle service area information/data, may indicate the availability of each item/product type for the one or more delivery services at various destination locations. As will be described in greater detail herein, the inventory information/data may reflect the inventory currently present in each of the plurality of delivery vehicles 50, and may be provided to the vendor to facilitate a determination of whether the one or more delivery services are available for a particular destination location.

3. Item/Product Ordering

Figure 6:
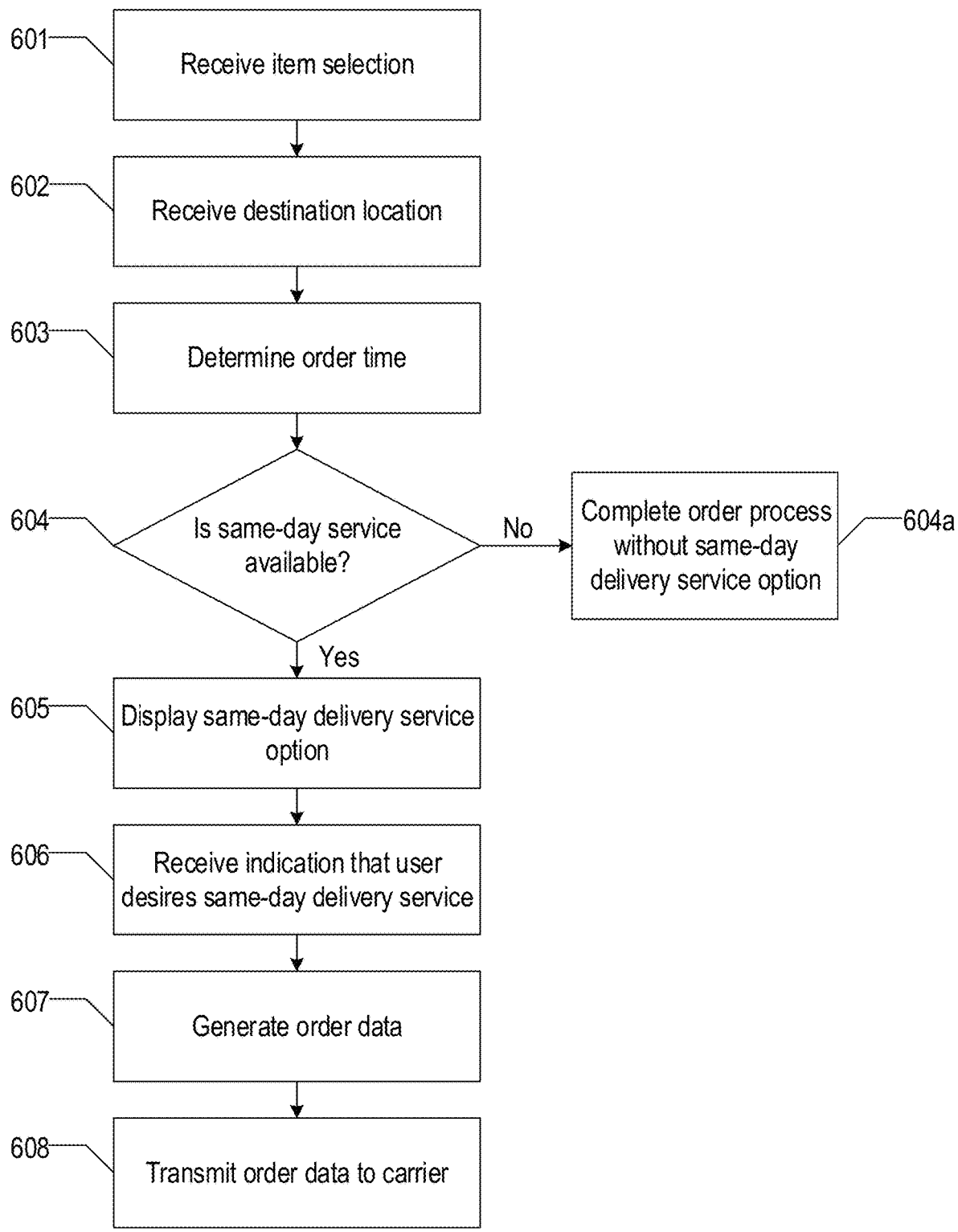
FIG. 6 is a flow chart illustrating various steps in receiving an order for one or more items/products to be delivered according to at least one of the one or more delivery services according to various embodiments of the present invention.

FIG. 6 is a flow chart illustrating various steps in completing an order for one or more items/products to be delivered according to the one or more delivery services. Generally, the vendor may accept orders for items/products to be delivered via at least one of the one or more delivery services via a web-accessible ordering system (e.g., an Internet-based store presented via an interface) that may be accessed by user computing entities 110 operated by customers. The web-accessible ordering system may be generated by the vendor computing entity 120, and may be configured such that information/data provided by a customer is provided to the vendor computing entity 120. As shown in FIG. 6, the process may begin by receiving an item/product selection as shown at Block 601. For example, a customer may select one or more items/products by placing the one or more items/products into a shopping cart feature of the web-accessible ordering system, and by completing the order process via the web-accessible ordering system, such that the vendor computing system 120 receives the item/product selection. During the order process, the vendor computing entity 120 may receive a destination location from the customer as shown at Block 602. For example, the customer may provide a shipping address during the order process. Moreover, during the order process, the vendor computing entity 120 may determine the order time (e.g., the time at which the order is placed) at Block 603. In various embodiments, the vendor computing entity 120 may receive additional information/data, such as payment information/data, contact information, and/or the like from the customer during the checkout process.

At block 604, the vendor computing entity 120 may determine whether any of the one or more delivery services are available for the one or more items/products selected by the customer. In various embodiments, the vendor computing entity 120 may transmit a query to the carrier system 100 (e.g., via an Application Program Interface (API)) to determine whether the inventory info indicates that the one or more delivery services are available. The query may comprise information/data indicative of the destination location, the one or more requested items/products and/or the order time. In response, the carrier system 100 may determine whether the destination location is within the delivery service area, may determine whether the order was placed before a threshold delivery order time, and may determine one or more vehicle 50 service areas that may be utilized to deliver the item/product to the destination location. Because the ordering, processing, and delivery process takes a finite amount of time, certain of the one or more delivery services (e.g., same day, 1 hour, and/or 2 hour delivery) may require that orders are placed before a predefined time of day in order to ensure that sufficient time during the day remains in order to complete the necessary steps to deliver the item/product on the same day that the order is placed. Thus, orders placed after the threshold time of day may not be eligible for certain of the one or more delivery services. However, in various embodiments, orders placed after the threshold time of day, but which specify one or more items/products otherwise available for the delivery service are to be delivered within the delivery service region, may be eligible for delivery on a subsequent business day (e.g., the next business day) in accordance with the systems and methods described herein.

In various embodiments, the carrier system 100 may determine a threshold time of day based at least in part on the intended destination location. For example, the threshold time of day to place an order may be determined for each of a plurality of destination locations at the time an order is placed. The carrier system 100 may thus compare the location of the intended destination location against the location of each of the plurality of delivery vehicles 50 to determine whether delivery according to the one or more delivery services (e.g., same day delivery) is possible. In various embodiments, the carrier system 100 may determine whether delivery of the one or more items according to the one or more delivery services (e.g., same day delivery) based at least in part on traffic, weather, the number of pre-scheduled deliveries for each delivery vehicle 50, and/or the like.

Moreover, the carrier system 100 may periodically and/or continuously determine the number of deliveries that may be made according to the one or more delivery services in a particular day by one or more vehicles. Such determination may be made at least in part on the current time and/or the time at which deliveries are scheduled to end for a particular day. The carrier system 100 may determine the aggregate number of deliveries that may be made according to the one or more delivery services (e.g., by all delivery vehicles), the number of deliveries that may be made by each individual vehicle 50, and/or the number of deliveries that may be made in one or more particular regions (e.g., neighborhoods, zip codes, and/or the like). For example, at 1:00 PM, the carrier system 100 may determine that 10 deliveries may be made in a particular neighborhood according to the one or more deliveries services if orders are placed thereafter.

Upon identifying one or more vehicle 50 service areas for delivering the one or more items/products to the destination location, the carrier system 100 may determine whether any of the one or more delivery vehicles 50 traversing the one or more vehicle service areas have an item/product inventory stored therein that may be utilized to satisfy the item/product order. Upon a determination that the one or more delivery services are unavailable to complete the order, the carrier system 100 may transmit a notification (e.g., via the API) to the vendor computing entity 120, which may then continue the order process without offering the one or more delivery services, as shown in Block 604*a*. For example, upon a determination that the destination location is outside of the delivery service region, the order was placed after a threshold time, and/or the delivery vehicles 50 that may be utilized to deliver the one or more items/products to the destination location do not contain sufficient unallocated item/product inventory to satisfy the order, the carrier system 100 may transmit an indication to the vendor computing entity 120 that the delivery service is unavailable.

However, upon a determination that the one or more items/products may be delivered to the destination location via the one or more delivery services, the carrier system 100 sends a notification (e.g., via the API) to the vendor computing entity 120, which may then continue the order process by offering the one or more delivery services, as shown in Block 605. The vendor computing entity 120 may complete the order process by receiving additional information/data from the customer (e.g., payment information, contact information, and/or the like). During the completion of the order process, the vendor computing entity 120 may receive instructions from the customer to provide the one or more items/products according to the one or more delivery services, as shown in Block 606. Upon completion of the order process, the vendor computing entity 120 may generate order information/data, as shown in Block 607, and transmit the order information/data to the carrier system 100, as shown in Block 608 (e.g., via an API). In various embodiments, the order information/data may comprise information/data indicating that the one or more items/products are to be delivered according to at least one of the one or more delivery services, and may indicate the one or more items/products or one or more item/product types to be delivered as well as the destination location. In various embodiments, the order information/data may comprise contact information/data for the customer (e.g., a phone number, a cell phone number, an e-mail address, a social network profile, and/or the like), such that the carrier may generate and transmit one or more notifications to the customer regarding the status of the order.

4. Order Processing

Figure 7:
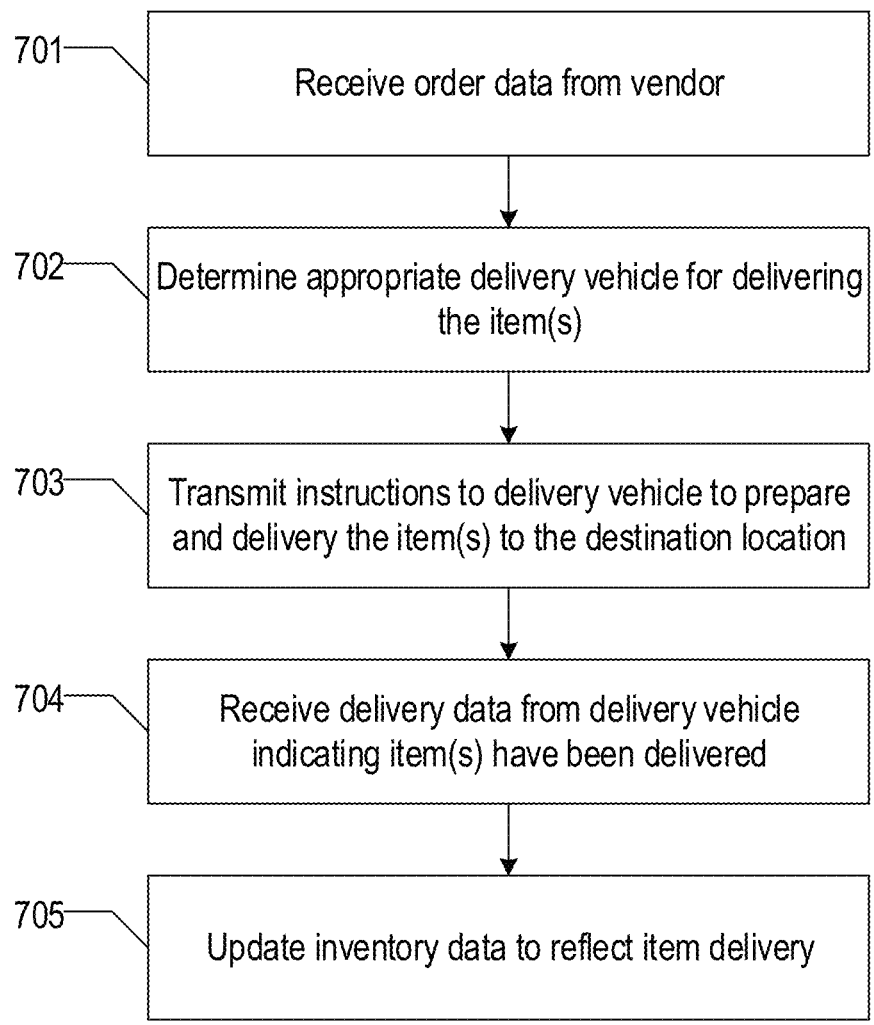
FIG. 7 is a flow chart illustrating various steps for processing an order for one or more items/products to be delivered according to at least one of the one or more delivery services according to various embodiments of the present invention.

In various embodiments, because the carrier's delivery vehicles 50 contain the item/product inventory, carrier personnel (e.g., delivery vehicle drivers) may prepare the items/products for delivery and to deliver the items/products to the destination location. FIG. 7 illustrates various operations performed by the carrier system 100 in processing the order received from the vendor computing entity 120. As shown in FIG. 7, the process may begin at Block 701 when the carrier system 100 receives the order information/data from the vendor computing entity 120. As previously indicated, the order information/data may comprise information/data indicating that the one or more items/products are to be delivered according to at least one of the one or more delivery services, and may indicate the one or more items/products to be delivered as well as the destination location.

Based at least in part on the destination location and the item/product to be delivered, the carrier system 100 may determine the appropriate delivery vehicle 50 for delivering the item/product to the destination location at Block 702. In instances in which the destination location may be within a geographical area assigned to two or more delivery vehicles 50 (e.g., within the vehicle service area assigned to two or more delivery vehicles), the determination of the appropriate delivery vehicle 50 to deliver the one or more items/products to the destination location may additionally be based at least in part on any combination of the following factors: (1) the current location of each of the delivery vehicles 50 along the respective delivery routes in light of the destination location, (2) the inventory level of the one or more item/product types in each of the plurality of delivery vehicles 50 traversing the plurality of service routes, (3) the number of delivery stops scheduled to be performed by each of the plurality of delivery vehicles 50, (4) the location of the stops scheduled for each of the delivery vehicles 50, (5) actual and/or anticipated traffic in an area surrounding the one or more vehicles, (6) actual and/or predicted weather in an area around the one or more vehicles 50, (7) national, regional, and/or local emergencies in an area around the one or more vehicles 50, (8) social network status of the consignee, (9) location status of the consignee, (10) time of day, and/or the like. Accordingly, the carrier system 100 may receive location information/data from each of the plurality of vehicles 50 indicating the current location of each of the plurality of delivery vehicles 50. As a non-limiting example, consider an order for a widget placed at 1:00 PM to be delivered to 123 Main Street according to a same-day delivery service selected from the one or more delivery services, wherein 123 Main Street is within the vehicle service area for Vehicle A and Vehicle B. At 1:00 PM, Vehicle A has already completed all of the scheduled deliveries assigned to Vehicle A in the area immediately surrounding 123 Main Street, and has begun travel away from the area. At the same time, Vehicle B has not yet approached the area surrounding 123 Main Street to complete the scheduled delivery stops assigned to Vehicle B, but remains farther away from the destination location than Vehicle A. Although Vehicle A remains closer to 123 Main Street, the carrier system 100 may assign the delivery of the widget to Vehicle B because Vehicle B has not yet approached the area surrounding 123 Main Street. However, if the inventory of widgets within Vehicle B has been depleted, the carrier system 100 may assign the delivery of the widget to Vehicle A, even though Vehicle A is travelling away from 123 Main Street along its assigned service route.

Upon identifying the appropriate delivery vehicle 50 to deliver the item/product to the destination location, the carrier system 100 may transmit instructions to the delivery vehicle 50 (e.g., to a mobile device 110 operated by the delivery vehicle driver) to deliver the one or more items/products to the destination location according to the same-day delivery service at Block 703. In various embodiments, the instructions may comprise an updated assigned service route which includes a stop at the destination location. If the delivery vehicle 50 is already scheduled to stop at the destination location (e.g., to deliver and/or pick-up other items), the updated assigned service route may reflect instructions to deliver the one or more items/products according to the same-day delivery service. Moreover, the instructions may indicate the type and quantity of item(s) to be delivered to the destination location. As will be described in greater detail herein, upon receipt of the instructions to deliver the one or more items/products according to at least one of the one or more delivery services, a delivery label for the one or more items/products to be delivered may be printed in the delivery vehicle 50, and the driver may attach the one or more delivery labels to the one or more items/products selected from the unallocated item/product inventory for delivery to the destination location.

Moreover, in various embodiments in which a plurality of items are to be delivered to a particular destination location, the carrier system 100 may transmit instructions to the delivery vehicle 50 (e.g., the mobile device 110 operated by the delivery vehicle driver) to select a plurality of items from the item inventory, place these items into a package or other container, and deliver the package/container to the delivery location.

Referring again to FIG. 7, the carrier system 100 may receive delivery information/data indicating that the one or more items/products have been delivered to the destination location from the delivery vehicle 50 (e.g., the portable mobile device 110 operated by the delivery vehicle driver) at Block 704. As will be described in greater detail herein, the delivery information/data may be generated in response to receiving input from the delivery vehicle driver indicating that the one or more items/products have been delivered.

At Block 705, the carrier system 100 updates the inventory information/data to reflect the item/product delivery. Thus, the carrier system 100 may subtract the number of items/products delivered from the available item/product inventory for the delivery vehicle 50. Accordingly, when receiving an inquiry from the vendor computing entity 120 regarding the availability of the one or more delivery services for one or more item/product types to be delivered to a destination location, the carrier system 100 may provide an indication of the availability of the one or more delivery services based at least in part on the updated inventory information/data reflecting the current inventory level in each of the delivery vehicles 50. Although the step for updating the inventory information/data is indicated as occurring after the item/product is delivered to the destination location, in various embodiments the process for updating the inventory information/data may occur at any time after receipt of the order information/data from the vendor computing entity 120 and the appropriate delivery vehicle 50 for delivering the item/product has been determined. Thus, the inventory information/data may be updated to reflect that one or more items/products in an inventory of a particular delivery vehicle 50 are scheduled to be delivered and thus these items/products are not considered to be a part of the unallocated item/product inventory and are unavailable to satisfy later orders. By updating the inventory information/data to reflect scheduled deliveries, the carrier system 100 may avoid over-exhausting the item/product inventory by scheduling delivery of more items/products that are available in the item/product inventory.

Moreover, in various embodiments, after an item has been delivered, the inventory information/data may be updated to reflect the decreased number of items stored in the vehicle 50. Thus, the inventory information/data may be indicative of the amount of space necessary to store the remaining items in the item inventory of the vehicle 50. For example, upon a determination that at least one item has been delivered, the inventory information/data may be updated to reflect that the amount of space occupied by the at least one item is available. Thus, the amount of space previously occupied by the one or more items may then be available for reservation by one or more vendors, for example, on a subsequent business day. In various instances in which the vendor may restock items to replace those that have been delivered (and therefore removed from the item inventory), the inventory information/data may indicate that the space previously occupied by a delivered item remains reserved for the vendor such that the vendor may replace the delivered item in the item inventory.

5. Item/Product Delivery

Figure 8:
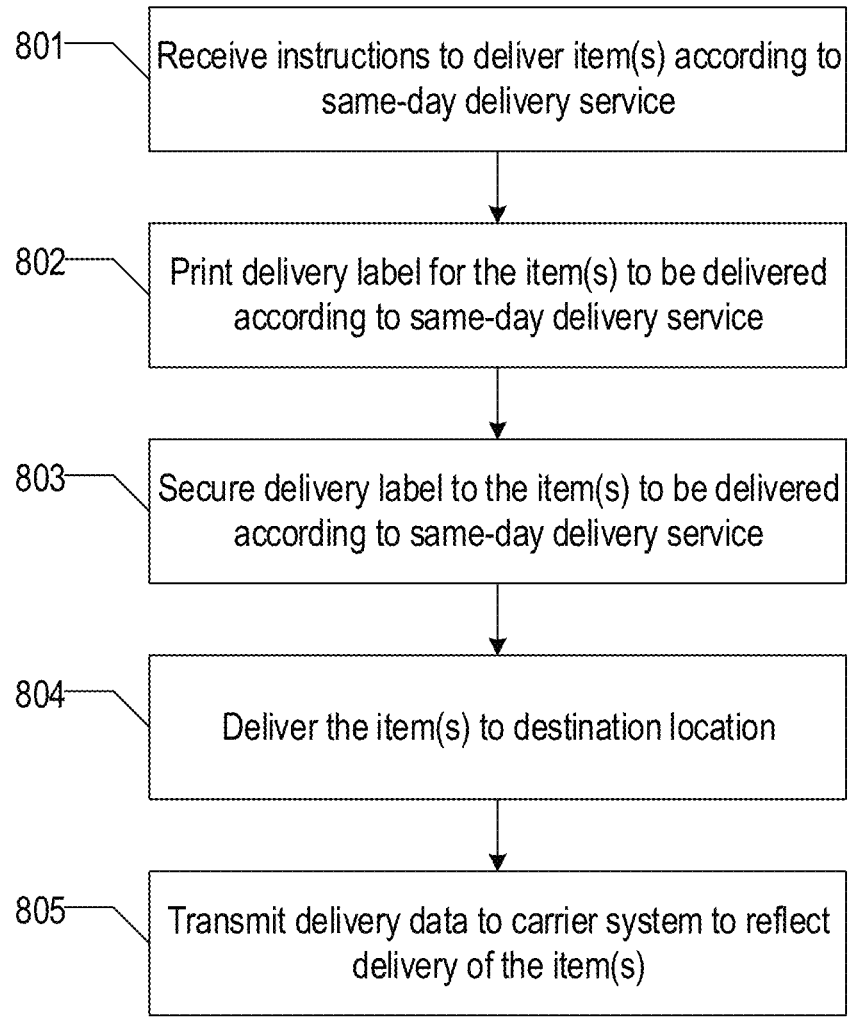
FIG. 8 is a flow chart illustrating various steps for delivering one or more items/products to a destination location according to at least one of the one or more delivery services according to various embodiments of the present invention.

FIG. 8 illustrates example steps carried out by the delivery vehicle driver and/or the mobile device 110 after receiving instructions to deliver one or more items/products according to the one or more delivery services. As shown in FIG. 8, at Block 801 the mobile device 110 receives the instructions to deliver the one or more items/products according to at least one of the one or more delivery services from the carrier system 100. As previously indicated, the instructions may comprise an updated service route including instructions to deliver the one or more items/products to the destination location, and/or may comprise an indication of the item/product type and quantity to be delivered according to the at least one of the one or more delivery services and the destination location.

After receiving the instructions to deliver the item/product according to at least one of the one or more delivery services, the mobile device 110 may print one or more delivery labels to be affixed to the one or more items/products to be delivered according to the one or more delivery services at Block 802. In various embodiments, the one or more delivery labels may be printed prior to the arrival of the delivery vehicle 50 at the destination location, or the one or more delivery labels may be printed once the delivery vehicle 50 has arrived at the destination location. The delivery vehicle driver then secures the one or more delivery labels to the one or more items/products to be delivered according to the one or more delivery services at Block 803. The one or more items/products may then be delivered to the destination location at Block 804. In various embodiments, during or after delivery of the one or more items/products to destination location, the mobile device 110 may generate delivery information/data indicating that the one or more items/products have been delivered to the destination location. For example, the mobile device 110 may generate the delivery information/data in response to user input indicating that the one or more items/products have been delivered to the destination location. As another example, the mobile device 110 may be used to scan a barcode or other machine readable indicia on each of the one or more delivery labels to indicate that the one or more items/products have been delivered to the destination location. Upon receipt of the information/data from the machine readable indicia, the mobile device 110 may generate the delivery information/data indicating that the one or more items/products have been delivered to the destination location.

As indicated at Block 805 of FIG. 8, after generation of the delivery information/data by the mobile device 110, the mobile device 110 may transmit the delivery information/data to the carrier system 100. As indicated herein, the carrier system 100 may, in various embodiments, update the inventory information/data in response to receipt of the delivery information/data. Accordingly, the inventory information/data may be indicative of the aggregate number of items remaining in all of the delivery vehicles containing an item inventory, the number of items remaining in each individual delivery vehicle, and/or the number of items remaining for each delivery service area. In various embodiments, the inventory information/data may be indicative of the number of items remaining in each of a plurality of individual geographical areas that collectively make up the delivery service area. For example, the inventory information/data may be indicative of the number of items available for delivery in particular neighborhoods, zip codes, counties, cities, towns, GPS coordinate ranges (e.g., regions defined by a particular range of latitude and longitude coordinates) and/or the like. The particular geographical definitions used for providing inventory information/data may be defined by the vendor and/or the carrier. Moreover, in various embodiments, the carrier system 100 may generate and transmit one or more notifications to the customer to indicate that the one or more items/products have been delivered to the destination location. The carrier system 100 may also generate and transmit notifications to the vendor computing entity 120 to indicate that the one or more items/products have been delivered to the destination location.

In various embodiments, after the one or more items are delivered, the carrier system 100 may update the availability information/data to reflect the amount of space available in the one or more delivery vehicles after delivering the one or more items according to the one or more delivery services.

IV. ALTERNATIVE EMBODIMENTS

In various alternative embodiments, the one or more delivery services may be provided by delivering and/or otherwise making available an item purchased by a customer at a carrier access point. As used herein, a carrier access point may be a location at which a carrier may deliver items shipped by a consignor that may be picked-up later by an intended recipient of the item. Access points may be staffed locations (e.g., a carrier- or third-party-operated store with one or more employees) or unstaffed locations (e.g., a collection of lockers). In various embodiments, an intended recipient of an item may be alerted to the presence of an item at a particular access point. For example, the carrier system 100 may transmit a notification message to the intended recipient of an item (e.g., via email, text message, automated voice message, and/or the like) informing the intended recipient of the presence of an item at a particular access point. Upon reaching the access point, the intended recipient may provide information/data verifying the intended recipient's identity (e.g., by presenting an identification card, a unique access code, a tracking number, an item identifying code, and/or the like), and the intended recipient may be granted access to the item for pick-up. For example, at staffed access points, the intended recipient may interact with an employee of the access point during the identity verification process and to receive the item. As another example, at an unstaffed access point, the intended recipient may interact with a user interface in communication with one or more lockers during the identity verification process and in order to be granted access to the item. For example, after verifying the intended recipient's identity, the user interface of an unstaffed access point may unlock a locker containing the intended recipient's item.

Accordingly, in various embodiments the vendor may store an item inventory at one or more access points to be made available to customers on the same day as the customer places an order. Thus, for example, after the customer places an order via the vendor's web-accessible ordering system (e.g., an Internet-based store presented via an interface) and selects one of the one or more shipping options (e.g., a same-day shipping option), the customer may be informed that his or her item is available for pick-up at a particular access point. For staffed access points, the customer may present identifying information/data to an employee of the access point, who may then give the customer an item selected from the stored inventory of items. For an unstaffed access point, each of a plurality of lockers may contain a single item of the vendor's unallocated item inventory. Upon receipt of information/data verifying the customer's identity, the unstaffed access point may grant the customer access to a particular locker having an item selected from the vendor's unallocated inventory that satisfies the customer's order.

In such embodiments, the vendor may reserve logical space at one or more access points. Accordingly, the parameters defining the logical space may be defined as follows: (1) the size parameter may define the amount of space and/or the number of lockers to be reserved at a particular access point, (2) the service area parameter may define the location and/or identity of the access points to be used to store the items, (3) the time parameter may define the amount of time that the access points will store the unallocated items for the vendor, and (4) the one or more limitations may define various limitations regarding the one or more delivery services that may be provided utilizing the access points.

V. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed That which is claimed:

1. A carrier system for requesting and reserving space on a delivery vehicle for an unallocated item lacking a scheduled destination location, comprising:
a dimensional scanner for acquiring dimensional data including detecting at least one of a height, length, and width;
a device associated with the delivery vehicle having a location module for acquiring location data;
a memory for storing the dimensional data and the location data;
a processor that is configured to reserve space on the delivery vehicle by performing, for the unallocated item, steps comprising:
receiving a request to reserve available space comprising a target geographic area for the unallocated item and a target delivery time period for the unallocated item;
creating an inventory record for the unallocated item;
determining, based at least in part on the request and the location data from the location module, that the delivery vehicle services the target geographic area by having a route that includes the target geographic area at the target delivery time period;
scanning, via the dimensional scanner, a plurality of packages associated with the delivery vehicle to acquire the dimensional data for each package;
predicting a volume of reserved space in the delivery vehicle based at least in part on the dimensional data;
determining a volume of logical space remaining in the delivery vehicle based at least in part on the dimensional data;
based on determining the volume, causing a loading of the unallocated item into the delivery vehicle to store the unallocated item within the delivery vehicle;
receiving an instruction to deliver the unallocated item from the delivery vehicle to a destination location within the target geographic area based at least in part on a customer shipment request;
instructing delivery of the unallocated item to the destination location within the target geographic area;
instructing a printing of a delivery label for the unallocated item that includes the destination location and configured to be affixed to the unallocated item, wherein the delivery label is printed after the delivery vehicle is at the destination location; and
updating inventory data to indicate the delivery of the unallocated item.

2. The system of claim 1, the steps further comprising:
receiving a request to reserve the volume of logical space for the delivery vehicle; and
based on the request, reserving the volume of logical space.

3. The system of claim 1, wherein the instruction to deliver includes order data for the unallocated item received from a vendor computing entity, and the order data is generated by the vendor computing entity in response to receipt of an order for the unallocated item.

4. The system of claim 3, the steps further comprising:
receiving delivery data indicating that the unallocated item has been delivered to the destination location;
updating the inventory data for the delivery vehicle to indicate a number of the unallocated item remaining in an unallocated item inventory; and
transmitting the delivery data or the inventory data to the vendor computing entity.

5. The system of claim 1, wherein the predicted volume of reserved space is further predicted based on historical delivery data.

6. The system of claim 1, wherein the request comprises at least one of: an unallocated item description, an unallocated item size, or an unallocated item weight.

7. A system for loading a delivery vehicle based on a volume of reserved space and a volume of logical space, the system comprising:
a dimensional scanner for acquiring dimensional data including detecting at least one of a height, length, and width;
one or more processors; and
one or more computer-readable memory having instructions stored thereon, that when executed by the one or more processors, cause the one or more processors to:
receive a request to reserve available space inside the delivery vehicle to store an unallocated item, the request comprising (a) a geographic area that the unallocated item needs to be within, (b) a time period for which the available space is needed to store the unallocated item, and (c) item data indicating an amount of space needed for the unallocated item, wherein the unallocated item do not have scheduled destination locations;
instruct the dimensional scanner to determine the dimensional data for a plurality of packages, each of the plurality of packages having a destination location;
based on the request and the dimensional data, predict the volume of reserved space for the delivery vehicle that is a candidate to store the unallocated item;
determine the volume of logical space remaining in the delivery vehicle based on the predicted volume of reserved space and an interior volume of the delivery vehicle;
based at least in part on the volume of logical space remaining in the delivery vehicle meeting the amount of space needed, provide computer-readable loading instructions that instruct loading of the plurality of packages having destination locations onto the delivery vehicle up to the predicted volume of reserved space, and that instruct loading the unallocated item without the scheduled destination locations onto the delivery vehicle up to the volume of logical space;
at least partially in response to the providing of the computer-readable loading instructions, cause the unallocated item to be physically loaded into the delivery vehicle;
subsequent to the loading of the unallocated item into the delivery vehicle, receive a shipment request to ship a requested item to the destination location according to a delivery service;
in response to the receiving of the shipment request, determine whether the destination location is within the geographic area and whether the requested item matches the unallocated item by a location module associated with the delivery vehicle using acquired location data;
based at least in part on determining that the destination location is within the geographic area and the requested item matches the unallocated item, determine that the delivery service is possible; and instruct a printing of a delivery label for the unallocated item including the destination location and configured to be affixed to the unallocated item, wherein the delivery label is printed after the delivery vehicle is at the destination location.

8. The system of claim 7, wherein the one or more processors further:

update inventory data for the delivery vehicle to reflect an inventory level for the unallocated item; and provide the inventory level to a vendor associated with the unallocated item.

9. The system of claim 8, wherein, the one or more processors further:

receive order data for the unallocated item, the order data indicating the destination location, wherein the order data is received from a vendor computing entity, and the order data is generated by the vendor computing entity in response to receipt of an order for the unallocated item.

10. The system of claim 9, wherein the one or more processors further:

receive delivery data indicating that the unallocated item has been delivered to the destination location; and adding an inventory pick-up stop to a route to increase the inventory level for the unallocated item.

11. The system of claim 7, wherein the predicted volume of reserved space is further predicted based on historical delivery data.

* * * * *

UNITED STATES PATENT AND TRADEMARK OFFICE
CERTIFICATE OF CORRECTION

PATENT NO. : 11,144,870 B2
APPLICATION NO. : 14/859766
DATED : October 12, 2021
INVENTOR(S) : Paul Loubriel It is certified that error appears in the above-identified patent and that said Letters Patent is hereby corrected as shown below:

In the Specification

In Column 29, Line 17, after "may" insert -- be --.

Signed and Sealed this
Thirty-first Day of May, 2022

Katherine Kelly Vidal
*Director of the United States Patent and Trademark Office*